United States Patent [19]
Lucas et al.

[11] Patent Number: 6,012,074
[45] Date of Patent: Jan. 4, 2000

[54] DOCUMENT MANAGEMENT SYSTEM WITH DELIMITERS DEFINED AT RUN-TIME

[75] Inventors: Peter Lucas; Jeffrey A. Senn, both of Pittsburgh, Pa.

[73] Assignee: Digital Equipment Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/810,838

[22] Filed: Mar. 4, 1997

Related U.S. Application Data

[63] Continuation of application No. 08/561,218, Nov. 21, 1995, abandoned, which is a continuation of application No. 08/123,542, Sep. 17, 1993, abandoned.

[51] Int. Cl.[7] ................................................. G06F 17/22
[52] U.S. Cl. ............................ 707/531; 707/513; 707/514
[58] Field of Search ................................. 395/793, 802, 395/606; 707/531, 3, 513, 514

[56] References Cited

U.S. PATENT DOCUMENTS

| | | | |
|---|---|---|---|
| 4,965,763 | 10/1990 | Zamora | 364/419.19 |
| 4,972,349 | 11/1990 | Kleinberger | 395/144 |
| 5,210,824 | 5/1993 | Putz et al. | 395/145 |
| 5,222,242 | 6/1993 | Choi et al. | 395/800 |
| 5,258,855 | 11/1993 | Lech et al. | 358/462 |
| 5,299,122 | 3/1994 | Wang et al. | 364/419.1 |
| 5,299,123 | 3/1994 | Wang et al. | 364/419.1 |
| 5,404,295 | 4/1995 | Katz et al. | 707/2 |
| 5,511,159 | 4/1996 | Baker et al. | 395/326 |
| 5,627,748 | 5/1997 | Baker et al. | 395/792 |

OTHER PUBLICATIONS

*Microsoft BASIC Programmer's Guide,* Version 7.0, Chapter 4, String Processing, pp. 133–146, Jan. 1989.
Walter, "Compound documents: interchange and intergration", *The Seybold Report on Desktop Publishing,* v. 5, n. 11, p. 10(16), Jul. 1991.
Tonomura et al., "Content oriented visual interface using video icons for visual database systems", Oct., 1989 IEEE Workshop on Visual Languages, pp. 68–73.
Card, S.K., Robertson, G.G., and Mackinlay, J.D., "The Information Visualizer, an Information Workspace," Proceedings of CHI'91, ACM/SIGCHI, 1991, pp. 181–188.
Goodman, D., *The Complete Hypercard Handbook,* Bantam Books, New York, 1987, pp. 20–39, 85, 86, 97–105, 341–413, 415, 469–470, 529–535.
Henderson, D.A. Jr., and Card, S.K., "Rooms: The Use of Multiple Virtual Workspaces to Reduce Space Contention in a Window–based Graphical User Interface," ACM Transactions on Graphics, vol. 5,No. 3, Jul. 1986, pp. 211–243.
Houde, S., "Interative Design of an Interface for Easy 3–D Direct Manipulation," Proceedings of CHI'92, ACM/SIG-CHI, 1992, pp. 135–142.
Kaufman, Lloyd, *Sight and Mind: An Introduction to Visual Perception,* Oxford University Press, New York, 1974, pp. 322–366.

(List continued on next page.)

*Primary Examiner*—Stephen S. Hong
*Attorney, Agent, or Firm*—Hamilton, Brook, Smith & Reynolds, P.C.

[57] ABSTRACT

A document management apparatus provides a user to define delimiters in order to specify portions of documents or attributes of documents to be retrieved from a document repository. The repository is searched for the defined delimiters and the portions of the documents or the attributes of documents are retrieved and put into a cache memory. The user-defined delimiters may be multi-character delimiters. The cache memory and the document repository may be connected over a network.

7 Claims, 14 Drawing Sheets

OTHER PUBLICATIONS

Mackinlay, J.D., Robertson, G.G., and Card, S.K., "The Perspective Wall: Detail and Context Smoothly Integrated," Proceedings of CHI'91, ACM/SIGCHI, 1991, pp. 173–179.

MacLean, A., Carter, K., Lövstrand, L., and Moran, T., "User–tailorable Systems: Pressing the Issues with Buttons," Proceedings of CHI'90, ACM/SIGCHI, 1990, pp. 175–182.

Malone, T.W., "How Do People Organize Their Desks? Implications for the Design of Office Information Systems," ACM Transactions on Office Information Systems, Jan. 1983, pp. 99–112.

Robertson, G.G., Card, S.K., and Mackinlay, J.D., "The Cognitive Coprocessor Architecture for Interactive User Interfaces," Proceedings of the ACM SIGGRAPH Symposium on User Interface Software and Technology, ACM, 1989, pp. 10–18.

Wanger, L., "The Effect of Shadow Quality on the Perception of Spatial Relationships in Computer Generated Imagery," Proceedings of the Symposium on Interactive 3D Graphics, ACM/SIGGRAPH, 1992, pp. 39–42.

Wanger, L.R., Fewerda, J.A., and Greenberg, D.P., "Perceiving Spatial Relationships in Computer Generated Images," IEEE Computer Graphics and Applications, pp. 44–59, May 1992.

Venolia, D., "Facile 3D Direct Manipulation," Proceedings of INTERCHI'93, ACM/SIGCHI, 1993, pp. 31–36.

Abney, "Parsing by Chunks", in *Principle–Based Parsing: Computation and Psycholinguistics,* R.C. Berwick et al. (eds.), pp. 257–278, Jan. 1991.

DOCUMENT MANAGEMENT SYSTEM WITH DELIMITERS DEFINED AT RUN-TIME

This application is a continuation of application Ser. No. 08/561,218, filed Nov. 21, 1995, now abandoned, which is a continuation of application Ser. No. 08/123,542, filed Sep. 17, 1993 all abandoned.

FIELD OF THE INVENTION

This invention relates generally to office management, and more specifically to manipulating documents on a computer and on a computer display device.

BACKGROUND

In working with documents on a computer, there are often problems in retrieving large documents or document attributes. Retrieving an entire document or attribute could fill up a cache memory and could tie up network traffic if the document being retrieved is stored on a remote node. This problem becomes more complex and difficult when several documents are retrieved. However, the computer user often requires only a portion of each document or attribute out of a desired set of documents. Bringing only those portions out of the repository saves cache memory and time that the network is tied up in the transfer of documents. Further, the computer user may not be a sophisticated programmer or may not want to spend time learning a complicated language or writing complicated programs in order to fetch the desired portions of documents.

There is a need for a simple way to retrieve portions of documents or document attributes from repositories.

SUMMARY

A document management apparatus provides means for a user to define delimiters in order to specify portions of documents or attributes of documents to be retrieved from a document repository. The repository is searched for the defined delimiters and the portions of the documents or the attributes of documents are retrieved and put into a cache memory. The user-defined delimiters may be multi-character delimiters. The cache memory and the document repository may be connected over a network.

These and other features and advantages of the present invention will become apparent from a detailed reading of the detailed description in conjunction with the attached drawings in which like reference numerals refer to the elements in the several views.

DETAILED DESCRIPTION

Documents

Figure 1:
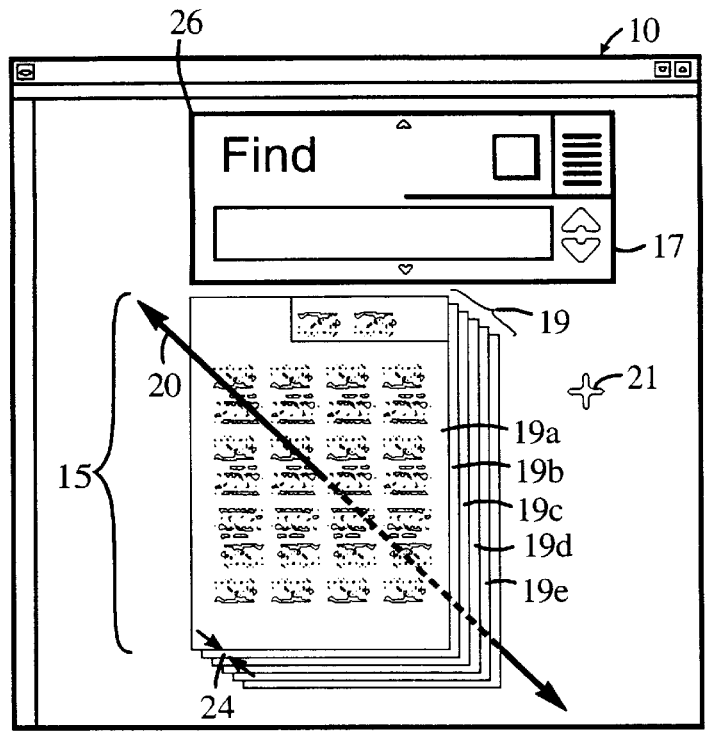
FIG. 1 is a drawing of a strand.

A document is the primary object in the system. All data are contained in documents. A document contains some number of attributes, each attribute having a name and a value. The set of attributes for any given document is arbitrary, and no particular attributes are required of all documents.

A screen object is the visual representation of a document. It may be visible or hidden at any given time. Screen objects are generally rectangular.

A Unique Identifier, or UID, is a string of alphanumerics that uniquely identifies a document. A UID is necessary and sufficient to refer to a specific document.

Attribute/Value Pairs

An attribute is a piece of data stored in a document. Each attribute has an attribute name and an attribute value. An attribute name uniquely identifies an attribute value within a document.

The Script Interpreter

Script consists of a scripting language that can be executed to perform some action. It is stored in attribute values. Scripting language is a language used to specify commands to the system environment.

The script interpreters (architecturally there can be any number) interpret script which is stored in attributes of documents. Scripts can modify attributes of documents, perform basic mathematical and search operations, call other scripts, and do other basic operations such as insert or remove documents from strands. Most of the actions in the system are activated by calling scripts within documents.

Documents are the single abstraction structure in the script language. There is no persistent storage associated with the script environment other than attributes of documents. Most of the actions in the system (other than simple dragging of documents) are activated by calling scripts within documents.

A document consists of attribute/value pairs; by referencing an attribute in an expression, the value is returned.

The value of any attribute, ephemeral or not, may be executable script. Script thus allows the power user to extend the functionality of the system. For example, a user may define the value of an attribute by writing his or her own script as the value of that attribute.

Whether an attribute is executable or not is typically established by convention. For example, for a given implementation, an architecturally defined set of messages may indicate that the attributes referenced by the messages are executable. Or, a button on the mouse may be architecturally defined to invoke and execute the script contained in an attribute of the document in which the cursor is located when that button is clicked by the user. In addition, or as an alternative, an identifier process can be designed and used to determine whether the value of an attribute is script, and also what script interpreter is needed to interpret it. The identifier process does not test whether the script can be properly parsed, but upon determining that the value of an attribute is script, chooses which script interpreter to call to interpret the script. For example, the identifier process can select an interpreter for a dialect of the LISP programming language by checking the first non-whitespace character to see if it is a left parenthesis or single-quote. If the first non-whitespace character is a left parenthesis of a single-quote, the identifier process selects the interpreter for the dialect of the LISP programming language to interpret the script.

A goal in designing a particular script language is that the script language be easy to read. Users may not be computer scientists, but will nevertheless want to examine and modify scripts to a certain extent. Therefore the language must have few special characters, and generally use natural language words instead of symbols.

The script language should be uniformly structured, in that the only storage entity (object) in the language is a document consisting of attribute/value pairs. Values may be atomic, such as strings, numbers, dates, or images, or they may be pointers (UID's) to other documents. Global objects may be stored as attributes in a universal "global" document which is visible to all scripts.

Attributes are generally not typed, but values are generally typed. The types of values are used to determine what operations are permissible. A script is executed within a document by evaluating an attribute whose value is a script, and whose type is executable.

Inputs to the System

An example embodiment of the system includes an input device, for example a mouse, to obtain information from the user regarding selecting and moving documents within the display. It will be clear to one skilled in the art of user interfaces that devices other than a mouse, such as a light pen, a voice controlled display, or a touch sensitive screen, are potential alternatives to the mouse.

The locations of mouse events, for example the pressing and or releasing of a mouse button, are recorded as the UID of the document in which the cursor is located when the mouse event occurs. The x, y or z position of the cursor at the time the mouse event occurred is recorded. The results of user actions to select or deselect one or more documents are similarly recorded.

Scanning Documents

Any paper document can be entered into the system by scanning. When scanning a document into the system, a cover sheet should be used. Each cover sheet is encoded with the identification of the owner of the document. Such identification would, for example, consist of the unique user name defined within the system used to log-on or gain access to system.

In an example embodiment, when a document is scanned into the system, the scanned document is automatically placed in an IN BOX pile of the owner of the document. Each scanned document has an information sticker across its top displaying the name of the owner and the date it was scanned. The cover sheet is not included.

Scanned documents without cover sheets, or that have cover sheets that do not name valid users, cannot be delivered to the true owner of the document by the system. The system may be configured to deliver such scanned documents to a designated user, who is responsible for determining the owner of the scanned documents.

The Visual Presentation: The Workspace

A workspace is a virtual three dimensional space in which a set of documents are arranged. In this way a workspace contains a set of documents. Within a workspace, there is a list of the documents contained within the workspace, consisting of combinations of repository identifiers (RIDs) and unique identifiers (UIDs). Also, for each document within the workspace there exist ephemeral attributes, which describe the current visual display of that document within the workspace. Examples of ephemeral attributes include the X, Y, and Z positions of the document within the workspace.

A workspace is stored in a workspace document and displayed in a workspace window. A workspace document is a document that contains all of the state information of a workspace. A workspace document may be contained within other workspaces.

The display of a workspace on the display device is the "screen space" representation of the three dimensional workspace on the two dimensional display device. In an embodiment of the system, the screen space display of a workspace is implemented through a window in the host computer's windowing system, within which the two dimensional screen space rendering of the three dimensional workspace is displayed.

The system uses a three dimensional workspace to provide a useful display of potentially thousands of documents. A workspace may display thousands of documents. In a preferred embodiment of a workspace, the workspace is wrapped at the edges, giving a fish-eye lens effect, so that every screen object that is not invisible has at least some portion of its rectangle within the screen display no matter what its position in the three dimensional workspace.

Workspaces may be shared, such that multiple users have the same workspace open. For example, user one and user two could simultaneously have the same workspace open. In one embodiment, when user one drags a document within the workspace, user two sees it moving as well. The ephemeral attributes defining the visual representation of the documents within the workspace can be mediated via repository connections from user one to user two to support this feature. For example, both user one and user two could simultaneously read and write to a shared copy of the workspace document within a mutually accessible repository. Alternatively, user one and user two could maintain separate copies of the workspace document in their respective client modules, establish a direct network connection between them, and exchange ephemeral attribute updates via the direct network connection.

The Renderer Process

A renderer process is an element of the system that maintains the virtual three dimensional workspace. The renderer process is performed by various specific renderers.

A document renderer is that portion of the system that draws inside the rectangle of the screen object associated with each document in a workspace. The system supports multiple renderers, and which renderer is used for a particular document is determined by an attribute of that document.

A workspace viewer is a process in the system responsible for outlining the screen objects of documents within the workspace and managing the display of selection indication. The interior of each screen object is rendered by its associated renderer, and the workspace viewer completes the view. The workspace viewer is also that part of the system which is responsible for maintaining the view of a workspace. That is, the workspace viewer contains the means for arranging documents in three-space.

Ephemeral Attributes

Ephemeral attributes are attributes associated with a document in the context of a workspace. Ephemeral attributes are stored within a workspace document of the workspace containing the screen object of the specific document which the ephemeral attributes are associated with. Ephemeral attributes define the display characteristics of the associated document, such as position and size. Ephemeral attributes reflect the actions of the user in manipulating the screen object of a document within a workspace, typically through using an interface device such as a mouse.

Ephemeral attributes are stored in workspace documents, which in turn are stored in repositories. The complete state of the last image of a workspace, including ephemeral attributes associated with each document in the display, is stored in the permanent attributes of a workspace document when that document is stored into a repository. Thus a document may have different ephemeral attributes and values when that document is associated with different workspaces.

An ephemeral document is a document that has existence only in a workspace. It has no permanent attributes, only ephemeral ones. In an alternative embodiment, ephemeral documents may be stored in a virtual "workspace repository", accessible only from its workspace, and may have permanent attributes in this context. In such an alternative embodiment, the state of the workspace repository is stored as an attribute of the workspace document.

An intrinsic ephemeral attribute, or intrinsic attribute, is a special ephemeral attribute that every document must have, which directly effects the display of the screen object. Examples include x position (xpos), y position (ypos) and z position (zpos). Many intrinsic attributes are available for direct manipulation through the user interface device.

The Perspective Function

A perspective function maps objects on the screen by taking the three dimensional workspace coordinates, or "world space coordinates", maintained by the workspace viewer, and mapping them into two-dimensional screen space positions.

For example, every document has a position in world space defined along the x, y, and z axis, and every document has a width and a height. When an image of the document is drawn on the display device, the perspective function takes those world space coordinates and size variables as input parameters, and determines the actual size and location on the display device, in "screen space coordinates", where the document is actually going to be drawn. The perspective function is instantiated by the workspace viewer process.

Dragging Along the X, Y or Z Axis

To move a document around a workspace, there are three basic actions: dragging around, pushing back/pulling forward, and clipping. Dragging a document is the act of moving the corresponding screen object for that document with respect to one or more of the x, y, and z axis of the workspace by manipulation of the user interface device.

To move a document within the workspace, the user uses the user interface device to place the mouse cursor near the center of screen object of the document. The user next presses and holds the mouse button while moving the mouse. As a result, the screen object disappears and is replaced by an outline of its shape (called a drag box). As the mouse is moved, the drag box follows. This is known as dragging. When the mouse button is released, the screen object reappears in its new position.

Documents are pushed back and pulled forward via a modified drag action, e.g. using a separate mouse button, or by first moving the mouse cursor close to a corner of the screen object of the document, and then pressing and holding a mouse button. As an alternative a track ball device may be used to manipulate the position of the mouse cursor. As the mouse cursor is moved toward the bottom of the screen, the screen object is dragged forward (towards the user) within the workspace. As the mouse cursor is moved toward the upper left corner of the screen instead of forward, the screen object is pushed back within the workspace. Note that as the screen object on the display device is being moved, the virtual location of the corresponding document maintained in the world space of the workspace viewer is being changed accordingly. Thus one can either say that the screen object is being moved, or that the document is being moved, and have the same meaning.

As a document is pulled forward, the document is moved towards the user along the z axis of the three dimensional workspace. The perspective process translates this movement of the object towards the user into a screen representation of the screen object for the document. As a result, the screen object for the document grows in size in its two dimensional screen space representation. Conversely, when a document is pushed back, the screen object for the document is made smaller.

A document can only be moved forward a certain distance. When it is as big as it will get, it is plastered against the workspace window and cannot be moved any closer.

The world space size of a screen object is the size of the screen object in the three dimensional space of the workspace. This is the object's real size opposed to the screen space size at which it appears on the screen display surface. Documents and elements of documents (e.g. buttons, text fields, etc.) all have world space sizes. Although dragging along the Z axis can make the world space size of documents very small, they will never be rendered at a size that is invisible to the user.

In the case of "corner dragging" in the Z dimension, any of the four corners of a document may be used to push or pull it. However, the document will move along somewhat different paths depending on which corner is used.

Repositories

A repository is a data store that contains documents. A workspace is generally used for short term storage of documents. For long-term storage, documents are kept in repositories. When a system tool brings documents into a workspace, it gets them from repositories. A Repository Identifier, or RID, is a string of alphanumerics that uniquely identifies a repository. RIDs are unique on the network. An RID is necessary and sufficient to refer to a repository. In an alternative embodiment RIDs are universally unique, and therefore permanently stable in a global environment where mobile computing is increasing significant. For purposes of example, such universally unique RIDs may be assigned through a central RID allocation system, similar to how 48 bit Ethernet physical layer addresses are centrally assigned to specific network controllers, to guarantee that there are no duplicates.

The computer network that the system is connected to may have one repository available or it may have many. Some repositories are generic places to put documents, while others may be specialized. For example, a machine that sends and receives documents as faxes over telephone lines can be a repository. The user may choose to maintain a private repository on the local computer. Most repositories are on remote machines and the system gets documents from them over the network. A repository may exist on the local file system. An embodiment of the system may run on a system with no disks. In that case, all repositories exist within remote network nodes.

The user may retrieve documents from many different repositories at the same time. Similarly, multiple users can connect to the same repository at once. A user of a document may put a document into a shared repository marked to the attention of other specified users. Each user may configure a special FIND tool (which serves as their IN BOX) that constantly watches the repositories for documents marked for their attention and brings them into their workspace. In this way, documents may be shared between users.

Repositories are visually represented in a workspace by a document called a repository portal. The user accesses a repository through the repository portal for that repository. A repository may be password protected, such that the user may have to enter a password into the portal document before using the repository.

Repositories may have special characteristics (unusual connection requirements, limited hours of availability, etc.) These are represented to the user on the portal document. Repository portals also have a visual indication of whether their repositories are currently available for use.

A repository server is a server that serves documents from a repository to a client and provides a search engine, and repository interface to process search requests described by attribute value pairs from the client system, and to search the repository using the search protocol specific to that repository.

Strands

Strands are a system for positioning screen objects in a three-dimensional workspace. Strands allow grouping of documents, so that they can be manipulated as groups. Strands are a method of applying constraints to the organization of screen objects in three dimensions.

A strand is associated with a first document (the "strand parent"), and constrains the location of a set of documents not containing the strand parent. A strand is a process that maps a (possibly discontinuous) line into 3 space. Each strand child has a position on the strand relative to the strand origin. A strand also has minimum and maximum constraints for the spacing of its children.

Strands are not containers, but rather are a mechanism for arranging screen objects without hiding them. A strand constrains the position of screen objects attached to the strand into a certain shape. The certain shape is indicated by a strand function. When the strand function is evaluated, its output defines a strand path. A pile is an example of a strand where all the documents attached to a strand are constrained to be next to each other in the shape of a pile.

The strand path is mathematically defined as a one-dimensional path through three dimensions, along which are displayed the screen objects of the child documents of the strand. Objects attached to a strand path appear to be indirectly connected, as do pearls on a strand of string. The strand function can be arbitrarily set so that it is oriented in any direction or is any complex line. It can be a complicated function like a bunch of line segments joined together, or it could be U-shaped or zigzag-shaped.

A pile of documents is a strand having a strand path defined by a function causing the strand to be oriented substantially parallel to the Z access of the display, that is, going straight back from the surface of the display device that is closest to the user. A "tile" of documents is a set of documents placed next to each other so that the complete contents of their current screen objects are showing. A tile is defined as a strand having a strand path substantially parallel to the glass of the screen. The strand mechanism itself is completely general. The user may define a corkscrew strand path to have documents spiraling back into infinity if so desired.

An example of a system tool having a strand is as follows. The FIND operation may be a tool having a pile for its output. The FIND command locates documents, and puts them into a pile below itself. The output pile is attached to the FIND tool. When the FIND tool is moved, the pile follows. The FIND tool will "let go" of a document if the document is clicked and dragged away from the pile.

A strand parent is a document to which a strand is attached. The strand path for that strand is defined relative to an origin point defined with respect to the strand parent. For example, the strand path could be relative to an origin in the upper left corner of the screen object for the strand parent. Minimum and maximum separation constraints, associated with the strand parent, define the spacing between any two child documents on the strand to be greater than the separation minimum and less than the separation maximum. The minimum and maximum separation constraints may for example be stored in the strand parent.

FIG. 1 shows a display device 10, including an example of a strand 15. The strand 15 is shown having child document screen objects 19a, 19b . . . 19e, and parent document screen object 17. The strand path is shown by line 20, and the mouse cursor is shown by element 21. The separation of the child document screen objects 19 is shown at 24.

During operation of the system, with reference to the elements in FIG. 1, the strand path 20 is calculated by evaluating a strand function associated with strand parent represented by screen object 17. The exact orientation of the strand path 20 is determined with reference to an origin constraint associated with the strand parent screen object 17, for example, the upper left hand corner of the strand parent screen object 17 at point 26. The outputs of this evaluation are three dimensional coordinates that define the strand path 20 in the virtual representation maintained by the workspace viewer.

The child documents of the strand (corresponding to screen objects 19) are determined from a list of unique identifiers of the child documents associated with a strand parent document corresponding to screen object 17. The separation constraints associated with the strand parent document, indicating the minimum and maximum separation of child documents displayed along the strand path 20, are also evaluated. The output of these evaluations provides three dimensional coordinates defining the appearance and location of the child document screen objects 19 along the strand path 20.

The three dimensional coordinates are passed to a perspective process for translation into two dimensional screen space coordinates. The two dimensional screen space coordinates are used to display screen objects 19, representing child documents along the strand path 20, on the display device 10. The strand path 20 itself is not typically, but may be displayed on the display device. The separation 24 between the child documents cannot exceed the maximum separation constraint, and is not less than the minimum separation constraint associated with the strand parent document corresponding to screen object 17.

Strand parents may further include a knot constraint, defining points in the strand that divide the strand into sub-strands. Knot constraints may be arbitrarily defined, and are generally invisible to the user. For example, knot constraints may be used to subdivide the strand into two sub-parts so that the user has a pile of mail that has been read, and a pile of new mail, both within a single strand. Knots are used to keep those sub-strands (or sub-piles) separated.

Two applications for strands are presentation of documents in piles or tiles, and grouping documents. A strand is an object on the display device, and the user can pick up the strand by using the mouse to select the parent document of the strand. All of the strand's children are moved when the strand itself is moved. The system may be configured such that when the user selects a child document on the strand and moves it, the document is removed from the strand. In the alternative, the system can be configured such that moving any child document on the strand causes the entire strand and all other documents on the strand to move without removing the child document from the strand.

In the example shown in FIG. 1, the parent document corresponding to screen object 17 is a FIND tool. For example, the FIND tool may be used to locate documents containing a particular string of characters. When the FIND tool is used, the documents found to contain the string are displayed along the strand 15, in this case, a pile. The FIND tool is the parent of that strand. When the screen object for the FIND tool is moved on the display device, the pile is dragged with it.

Figure 2:
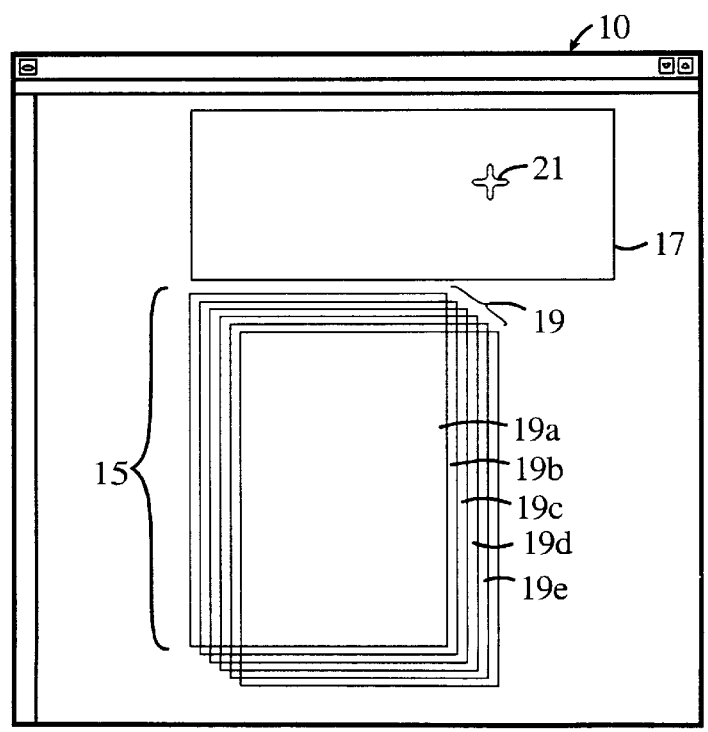
FIG. 2 is a drawing of a strand that has been selected by a user.

In FIG. 2, the elements shown in FIG. 1 are shown after the user has selected the screen object 17 of the strand parent for the strand 15. While the strand parent screen object 17 is selected, the user has also selected the entire strand 15, including child document screen objects 19. The strand parent screen object 17, and the child document screen objects 19 are shown as outlines while the strand 15 is selected. Further, while the strand 15 is selected, the user may use the mouse to move the cursor 21 around the display device 10, thereby moving the entire strand 15.

After the strand 15 is moved to its desired position, the user may deselect the strand 15, causing the screen objects 17 and 19 for the strand parent and strand children to be filled in again.

In another example embodiment of a system tool using a strand, a pile and scroll tool is used to browse through a collection of documents. It uses a U-shaped strand that tiles a few of the documents and piles other of the collected of documents. The use of the U-shaped strand makes the use of the tool more intuitive for the user, since both the currently tiled documents are displayed simultaneously with the piled documents.

Figure 3:
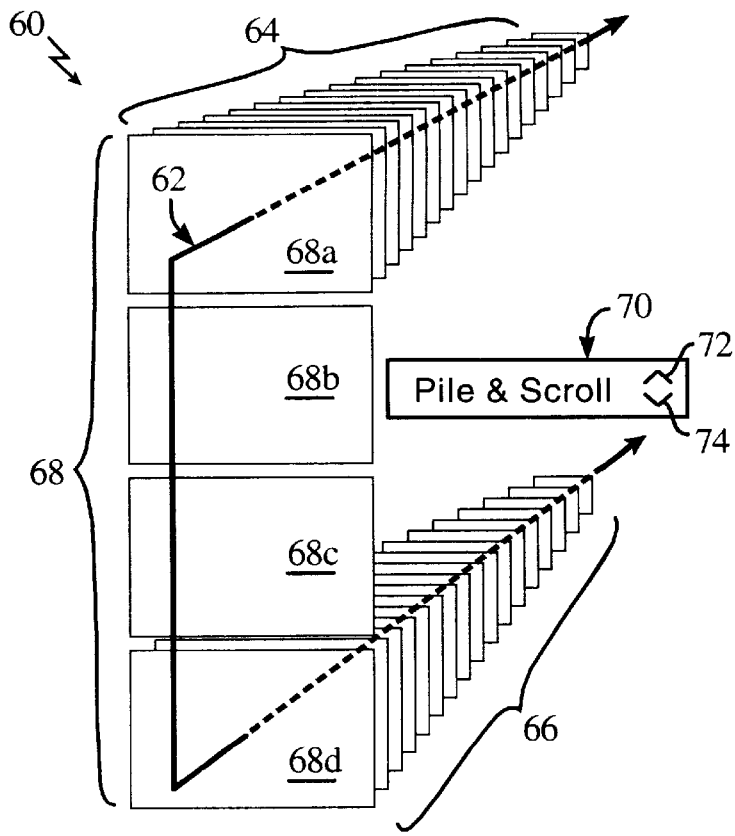
FIG. 3 is a drawing of a pile and scroll tool with a strand.

The pile and scroll tool 60 is shown in FIG. 3. Pile and scroll has a U-shaped strand function 62, including a first pile 64 and a second pile 66. In the configuration shown, first pile 64 in FIG. 3 is on top of a tiled section 68, and second pile 66 is on the bottom of the tiled section 68. The system allows other configurations and orientations of the strand. Documents 68a, 68b, 68c, and 68d, are shown in the tiled section between piles 64 and 66, and are tiled parallel to the screen.

The tile and scroll tool 60 in FIG. 3 has a control button 70, with up arrow 72 and down arrow 74. When the user brings the mouse cursor over up arrow 72 within the control button 70, and then clicks once on the mouse button, the tile and scroll tool 60 moves document 68a backwards into first pile 64, moves the documents 68b, 68c, and 68d upwards within the tiled documents 68, and brings forward a document from the second pile 66 to be displayed within the tiled section 68. If the user holds the mouse button down and does not release it while the mouse cursor is over the up arrow 72, multiple documents are continuously tiled into view from the second pile 66 until the mouse button is released.

Similarly, when the user moves the mouse cursor over the down arrow 74, and clicks once on the mouse button, a document is tiled into view from the first pile 64, and holding down the mouse button tiles multiple documents from first pile 64 until the mouse button is released. In this way, the user can browse through multiple collected documents using the pile and scroll tool 60.

In tiling, the documents look like they're beside each other, like pieces of paper on a table. They appear at the same distance from the user. Therefore, documents that are tiled are at the same Z position in the workspace, relative to the front of the display device.

Figure 4:
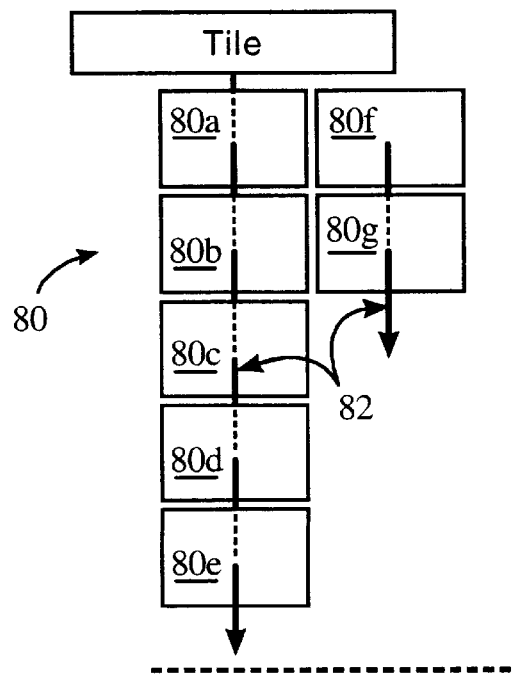
FIG. 4 is a drawing of a tile strand of documents.

In an example tile 80 shown in FIG. 4, the strand function 82 runs parallel to the screen, so that the documents 80a through 80g are threaded along the strand parallel to the screen. In a tile, the world space coordinates of the strand as maintained in three dimensions by the workspace viewer is parallel to the screen. In a pile, as shown above, the strand is not parallel, but perhaps perpendicular to the screen.

Figure 5:
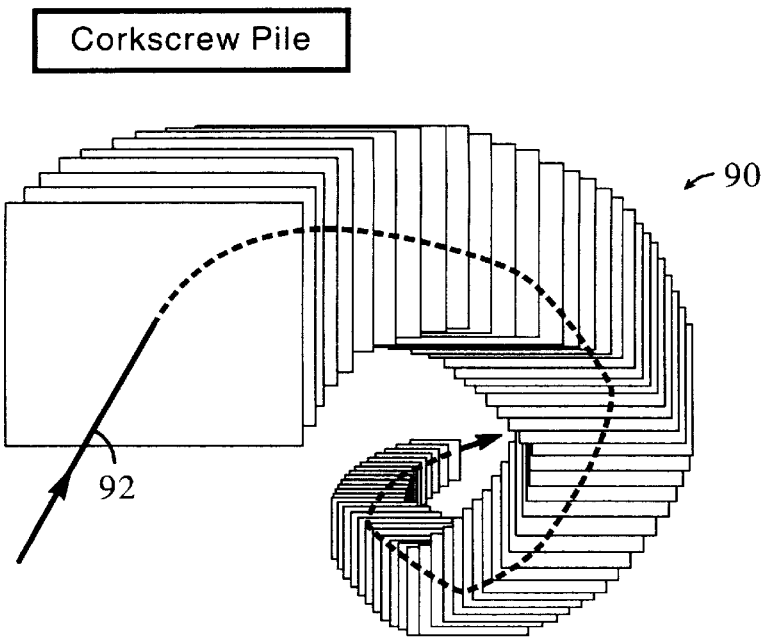
FIG. 5 is a drawing of a corkscrew strand of documents.

Thus it is seen that the strand function is an arbitrarily definable geometric function. An implementation may offer the user multiple pre-calculated strand functions, or an interface through which the user can define her own strand functions. As a further example of the flexibility of display provided by strands, FIG. 5 shows a corkscrew pile 90, having a strand function 92 defining a corkscrew shape.

Figure 6:
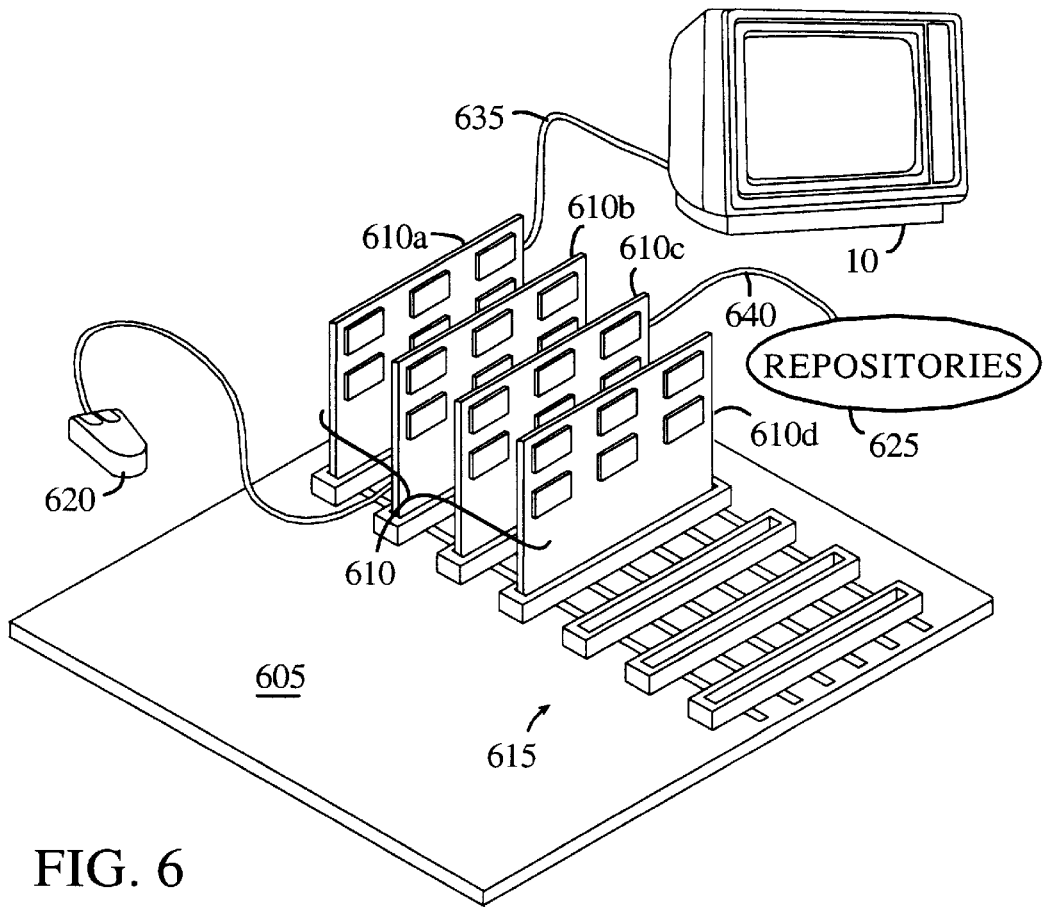
FIG. 6 is a drawing of an embodiment the system.

FIG. 6 shows an example embodiment of the document display system. A mother board 605 is shown having daughter boards 610, individually numbered 610a, 610b, 610c and 610d. The daughter boards 610 are coupled with the mother board 605 through parallel bus 615. Daughter board 610a is coupled with a display device 10 through serial interconnect 635, daughter board 610b is coupled with user input device 620, and daughter board 610c is coupled with repositories 625 via network 640.

During operation of the elements in FIG. 6, the user manipulates the user input device 620, thereby sending user input commands to the daughter board 610a. The logic within the daughter boards 610 then responds to the user commands by changing the view on the display device 10, and requesting and retrieving documents from the repositories 625.

Figure 7:
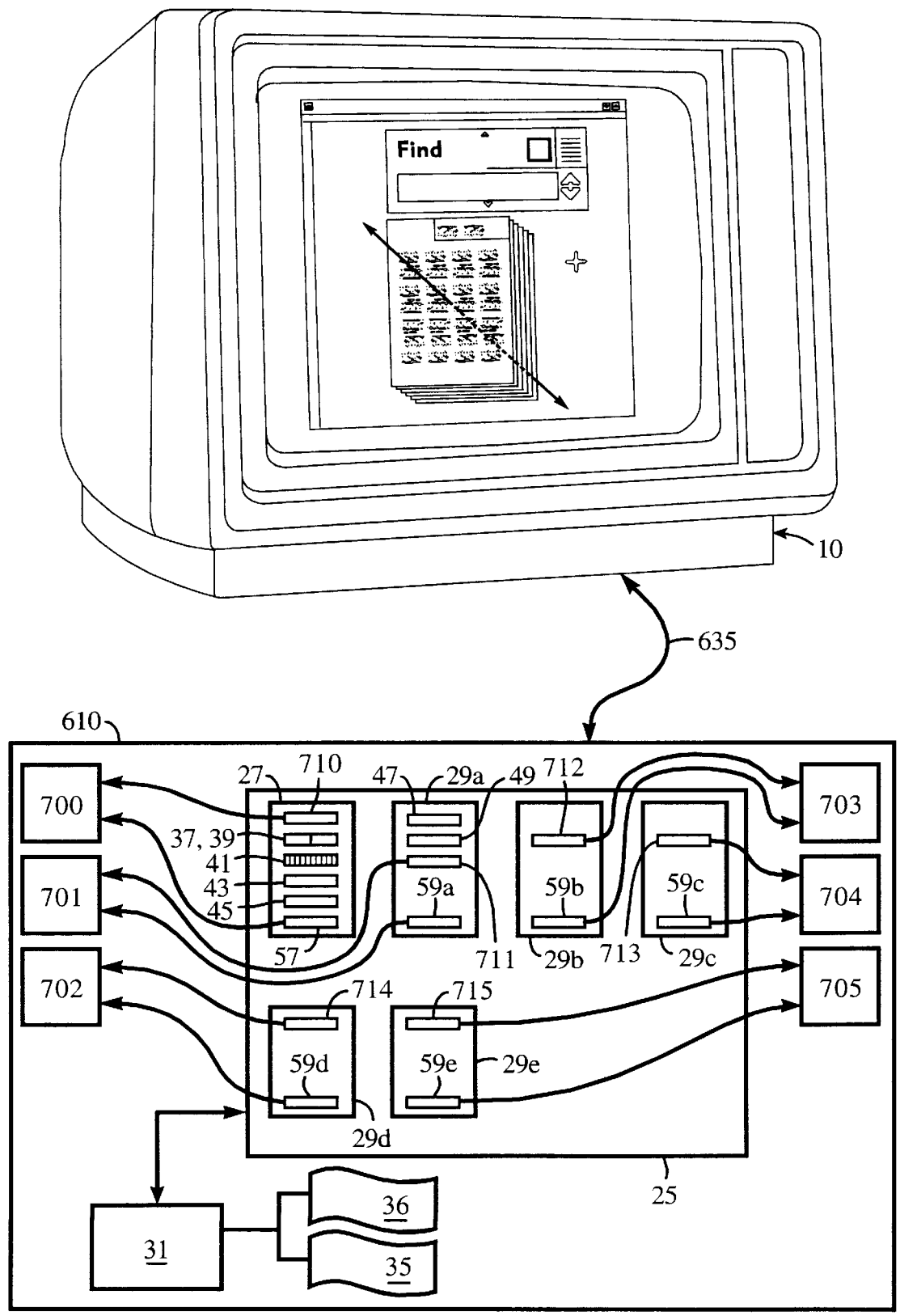
FIG. 7 is a drawing of a second embodiment of the system.

FIG. 7 shows elements in an example embodiment of the system. A display device 10 is shown displaying the example from FIG. 1. The display device 10 is coupled with a display controller 610 through serial interconnect 635.

The display controller 610 includes a memory 25, the memory 25 having parent document 27 (shown as screen object 17 in FIGS. 1 and 2), and child documents 29a, 29b, . . . 29e (shown as screen objects 19 in FIGS. 1 and 2). Parent document 27 includes minimum and maximum separation constraints 37 and 39 respectively, child document list 41, containing the unique identifiers for the child documents 29, strand origin constraint 43 and strand function constraint 45. The child documents 29 each contain parent pointer 47, containing the unique identifier of the parent document 27, and flags field 49, containing flags indicating whether the child may be removed from the strand when selected, and whether the child is to be displayed or concealed when the strand is displayed.

Also shown in FIG. 7 are processor 31, coupled with memory 25, as well as workspace viewer 35, and script engine 36. Script engine 36 and workspace viewer 35 are shown as processes running on processor 31, but it will be evident to one of skill in the art of computer science that these processes could alternatively be implemented in hardware, such as an application specific integrated circuit, or in firmware or microcode.

Also contained within each document is a document renderer attribute for that document. For example, parent document 27 contains document renderer attribute 57, and child documents 29a through 29e contain document renderer attributes 59a through 59e. The value of the document renderer attribute for each document indicates the document renderer for that document. In the example of FIG. 7, renderer attribute 57 indicates a document renderer 700, renderer attribute 59a indicates a renderer 701, and renderer attribute 59b indicates a renderer 703. Further, renderer attribute 59c indicates a renderer 704, renderer attribute 59d indicates a renderer 702, and renderer attribute 59e indicates a renderer 705. Thus in the example of FIG. 7 each document indicates a potentially different document renderer.

Each document may optionally contain a layout attribute, having a value equal to a script used to control the document renderer for that document. The script within the value of each layout attribute is capable of being interpreted by a script engine within the system, for example the script engine 36. In the example of FIG. 7, parent document 27 contains a layout attribute 710, for controlling the renderer 700, child document 29a contains a layout attribute 711 for controlling the renderer 701, child document 29b contains a layout attribute 712 for controlling the renderer 703, child document 29c contains a layout attribute 713 for controlling the renderer 704, child document 29d contains a layout attribute 714 for controlling the renderer 702, and child document 29e contains a layout attribute 715 for controlling the renderer 705.

Now with reference to the elements of FIG. 7, operation of the system is described. The workspace viewer 35 uses constraints from the strand parent document 27 to create three dimensional world space representation of the strand 15. The workspace viewer 35 maintains the current view to be displayed on the display device 10, including outlines of those documents currently displayed, and information defining which documents are currently selected. The document renderer attributes 57 and 59a through 59e indicate the document renderers 700 through 705 to be used to fill in the screen objects of those documents currently displayed on the display device 10. The workspace viewer 35 contains a perspective function to translate between three dimensional workspace coordinates and two dimensional screen space coordinates.

In a preferred implementation, document renderers 700 through 705 are implemented in an efficient programming language such as C, and controlled during execution by a script language contained in the values of layout attributes 710 through 715. The script in the values of layout attributes 710 through 715 is interpreted by the script engine 36. The primary task of the script language in this context is to set the values of attributes within documents. The script language therefore requires few verbs, as the values of a pre-defined set of attributes, known as intrinsic attributes, are used to control associated functions in the renderers 700 through 705.

The strand function 45 within strand parent 27 is a mathematical equation defining the strand path. The workspace viewer 35 processes the strand function 45 to obtain three space coordinates for the strand path 20 of the strand 15. The workspace viewer 35 inputs the strand origin constraint 43 to adjust the actual orientation of the strand path 20 relative to the upper left hand corner 20 of the screen object 17 of the strand parent 27.

The workspace viewer 35 inputs the child document list 41 and the minimum and maximum spacing constraints 37 and 39 to create world space three dimensional coordinates for the child documents along the strand path 20. The workspace viewer 35 passes the world space coordinates of the child documents 29 through a perspective process, which converts the three dimensional coordinates into two dimensional screen space coordinates. The workspace viewer 35 then sends the resulting screen space display through serial interconnect 635 to display device 10, causing the outlines of the screen objects of strand 15 to be displayed.

The layout attributes 710 through 715 are interpreted by the script engine 36. The system allows use of multiple script engines, and a document may either contain indication of which specific script engine to use to interpret the layout attribute for that document and thus control the document renderer for that document.

Figure 8A:
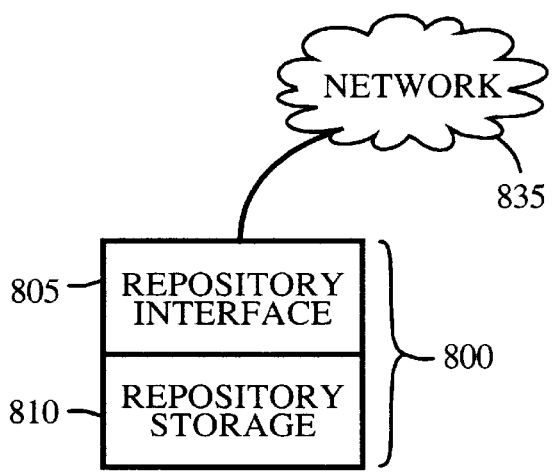
FIGS. 8A, 8B and 8C show repository interfaces.
Figure 8B:
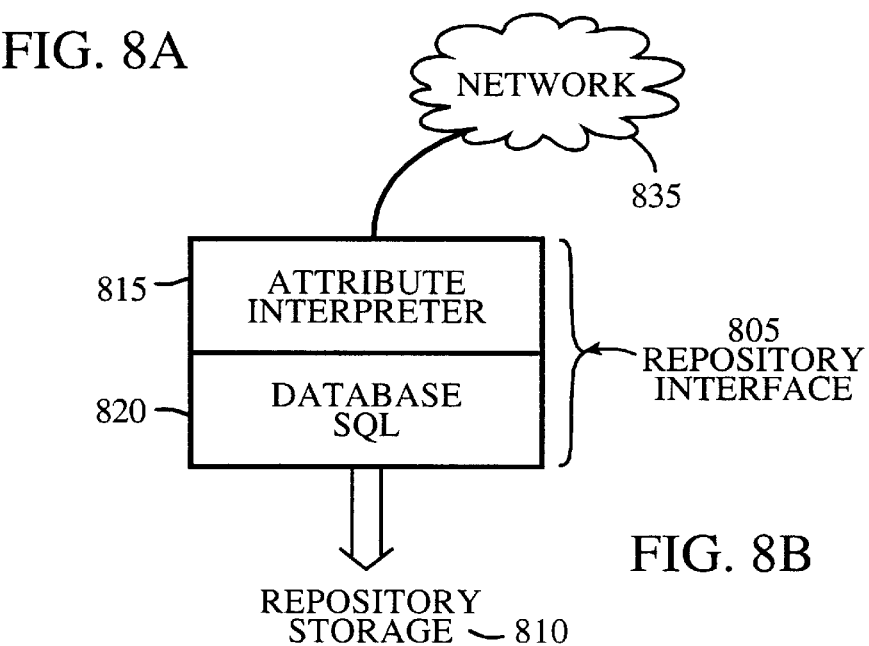
Figure 8C:
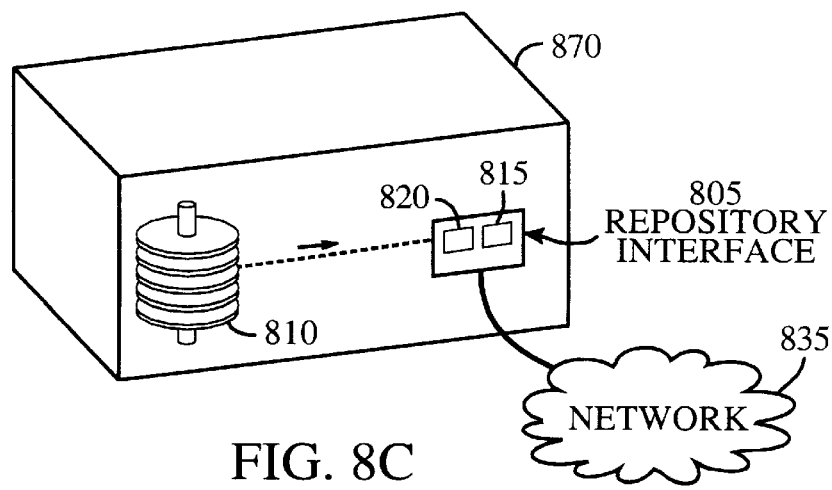

FIGS. 8a through 8c show an embodiment of a repository node 800. In FIG. 8A, the repository node 800 consists of a repository interface 805 coupled with a repository storage 810. During operation, the repository interface 805 receives repository requests from a client on a network 835. The repository interface 805 interprets the repository requests, and returns data from the repository storage 810.

FIG. 8B shows the logical processes within the repository interface 805. The repository interface 805 is shown to include an attribute interpreter process 815, coupled to a database standard query language (SQL) library 820. During operation, the attribute interpreter process 815 receives repository requests from the network 835, and translates the repository requests into database SQL commands, which are passed to the database SQL library 820. The database SQL library 820 returns the results of the commands issued by the attribute interpreter process 815, and the attribute interpreter process 815 then responds to the repository requests over the network 835. In this way, the attribute interpreter process 815 translates between the protocol of requests based on attribute having names and values, and the database SQL. Repository requests therefore may be based on attributes having names and values, independent of the type of search language used within the individual repository.

FIG. 8c shows a repository node 870, having repository storage in the form of a disc drive 810, and also having a repository interface 805. The repository interface 805 is coupled with the disc drive 810, as well as the network 835. The repository interface 805 includes the attribute interpreter process 815, as well as the database SQL library 820.

During operation of the elements in FIG. 8c, the repository interface 805 receives repository requests over the network 835. The repository requests refer to documents in terms of attributes having names and values. The attribute interpreter process 815 translates the repository requests into calls to functions in the database SQL library 820. The database SQL library 820 functions return information stored on discs within the disc drive 810. The attribute interpreter process 815 then responds to the repository requests with the information returned by the database SQL library 820, formatting the responses into attribute value pairs.

Figure 9:
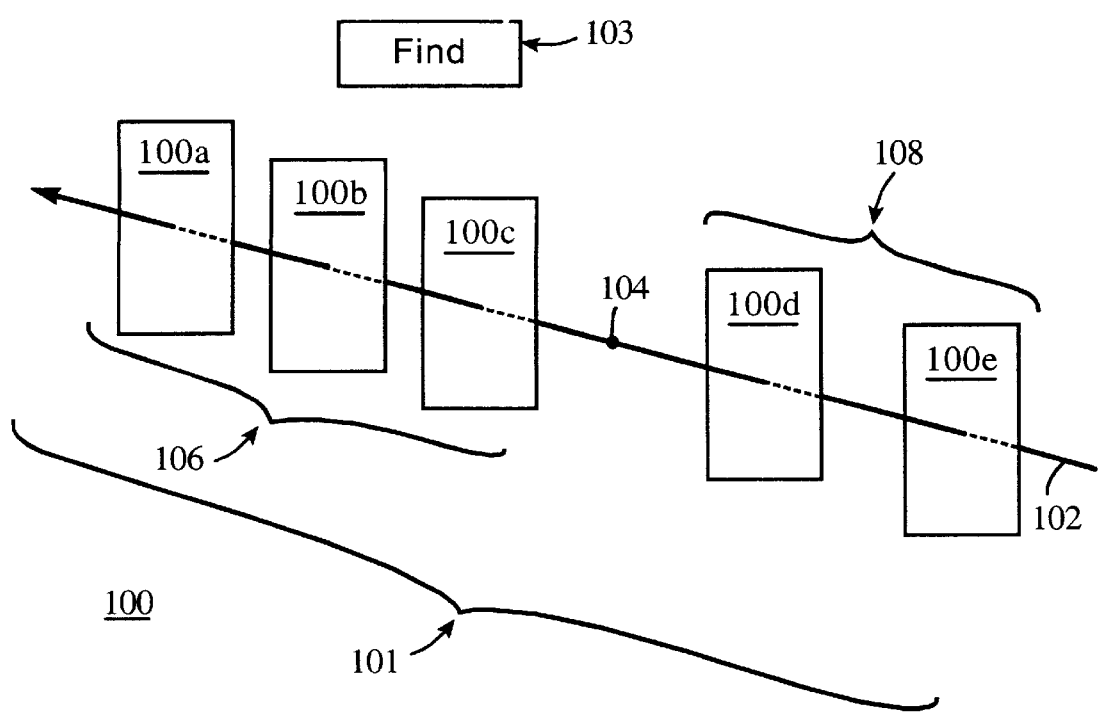
FIG. 9 is a drawing of a find tool with an output strand having a knot.

A strand may be defined having one or more knots that divide the strand into substrands. FIG. 9 shows a find tool 100 having an output strand 101, the output strand 101 having parent find tool document 103, and child documents 100a, 100b, 100c, 100d, and 100e. The output strand 101 further is shown having a knot 104, the knot 104 dividing the output strand 101 into a first substrand 106 and a second substrand 108. The first substrand 106 contains child documents 100a, 100b, and 100c, and second substrand 108 contains child documents 100d, and 100e.

During the operation of the elements shown in FIG. 9, the user activates the find tool 100 to search for needed documents, for example, those mail messages received from a given sender. The user also specifies a grouping for the find tool to use, for example all such mail messages previously read versus those not yet read. The user specifies that previously read documents be displayed in the background of the display relative to documents not yet read. The find tool 100 then locates those mail messages received from the specified sender.

The find tool 100 puts the unread mail messages received from the specified sender in the foreground of the output strand 101, followed by knot 104. Therefore, in the example of FIG. 9, the child documents 100a, 100b, and 100c are mail messages received from the specified sender, that are not yet read. The find tool 100 puts those mail messages received from the specified sender that have been read after the knot 104, in substrand 108. Thus, child documents 100d and 100e are mail messages from the specified sender that have previously been read.

As an alternative, the user requests that all mail messages received after a specified date be grouped in the foreground, and all others in the background. The knot 104 divides the two requested groups, and child documents 100a, 100b and 100c, in substrand 106, are those mail messages received after the specified date, and child documents 100d and 100e, in substrand 108, are those received prior to the specified date.

Sliding

Sliding is the direct manipulation mechanism for changing a strand child's strand position. Other children of the strand may be rearranged to satisfy the constraints of the strand.

A document may be moved along a strand through sliding, just like sliding a bead along a string. When the user slides a document on strand, other documents on the strand move as well, either pulling behind or pushing ahead of the sliding document. For example, if the strand max constraint is set, other documents follow along the sliding document such that the max constraint isn't violated.

Sliding may be either a user driven event, or script driven event. A user may slide a document by selecting the document with the cursor or other user interface device, and then directly changing the position of the document on the strand. Sliding may also be done when script is executed, for example as a result of execution of an attribute having script as a value.

The minimum and maximum separation constraints are evaluated such that a line in between the two documents in three space, in between the closest two points of the documents in three space, is guaranteed to be of greater length than the strand min and less than the strand max.

A document can be removed from the strand or inserted onto the strand. Both of those operations cause the constraints of the entire strand to be recomputed, resulting in other documents be repositioned on the strand if the constraints are no longer satisfied. When a document is moved, the spacing constraints are re-evaluated. If the spacing constraints are no longer satisfied, the changes are propagated to all of the documents to make sure that the documents are positioned in a way that causes the constraints to be satisfied. In an implementation of strands using knots, there may result a situation where it is impossible for all of the constraints to be satisfied. That is, there might be two knots and so many documents between them that the minimum distance constraint could not be satisfied. Under those circumstances the strand would spread the discrepancy out equally among all the documents on the effected strand or substrand.

Components in an Example Embodiment of the System

Figure 10:
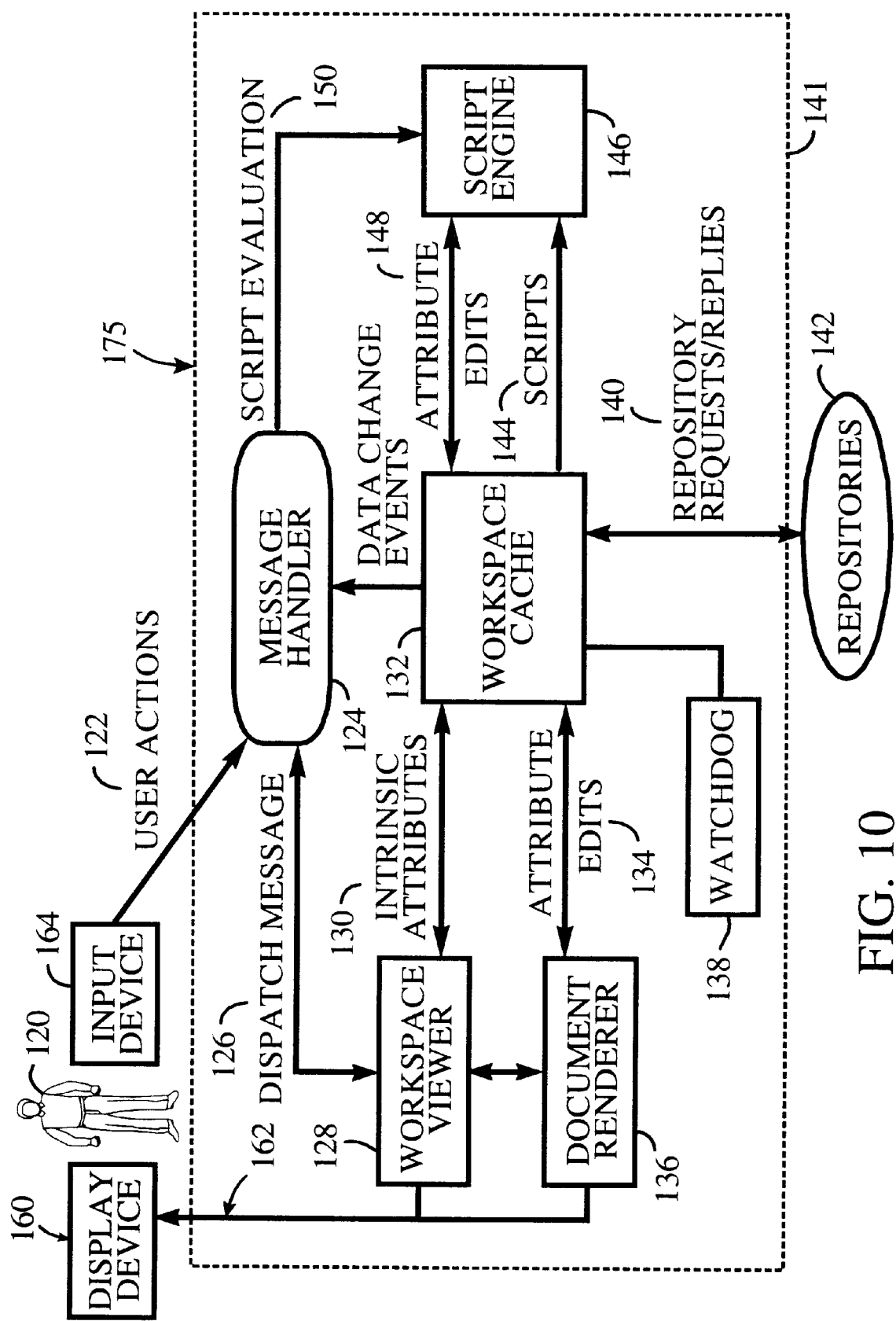
FIG. 10 is a block diagram of the architecture of a document display system using strands.

FIG. 10 is a block diagram of the architecture of a document display system. A user 120 interfaces with an input device 164, for example a mouse and/or a keyboard, to detect user actions 122. A message handler 124 is shown responsive to user actions 122. Message handler 124 is further coupled with a workspace viewer 128, such that message handler 124 sends and receives dispatch messages 126 to and from workspace viewer 128. The workspace viewer 128 is also coupled with a workspace cache 132, such that the message handler 124 can receive data change events from the workspace cache 132. The workspace viewer 124 is coupled with a script engine 146, such that script engine 146 performs script evaluation 150 for the message handler 124.

The workspace cache 132 is coupled with repositories 142, and sends repository requests 140 and receives repository replies 141. The workspace cache 132 is further coupled with the workspace viewer 128, and the workspace viewer 128 is capable of reading and writing intrinsic attributes 130 in the workspace cache 132. The workspace cache 132 is also coupled with a document renderer 136, and the document renderer 136 performs attribute edits 134 on attributes within the workspace cache 132. The workspace viewer 128 and the document renderer 136 are coupled with a display device 160, by means of screen update operations 162. Also, the workspace cache 132 is coupled with a watchdog process 138, and the script engine 146. The script engine 146 is capable of performing attribute edits 148 on attributes stored within the workspace cache 132. Those components within the dotted line 175 are core elements of the system.

The interaction of the elements in FIG. 10 is now described. The message handler 124 coordinates the computation necessary to execute scripts in the script engine 146, read and write data into the repositories 142, and keep the workspace on the screen consistent with data and user actions 122. The message handler 124 translates user actions 122 into messages that are dispatched 126 to the workspace viewer 128.

The workspace viewer 128 manipulates screen objects in three dimensions and allows direct manipulation by the user 120. The workspace viewer 128 manipulates attributes stored in the workspace cache 132, that are from documents stored in the repositories 142. The workspace viewer 128 displays data (attributes) that are stored in a workspace document as well as attributes of other documents referenced by the workspace viewer 128. A workspace document contains references to other documents and when opened displays screen objects that display data (attributes) contained within the referenced documents. Approximately there is one screen object per document reference.

Intrinsic attributes 130 are those attributes that each document has in workspace cache 123 while it is being referenced by a workspace document. An example of an intrinsic attribute is the "X" position of a document's screen object within the workspace window. Intrinsic attributes are sufficient to outline the screen object for a document.

The system maintains an asynchronous connection with any repositories 142 that it needs to access, and makes requests to the repository for any information needed to complete the current display. Repository requests are handled by an asynchronous remote procedure call mechanism.

The workspace viewer 128 operates on data contained in the workspace cache 132, from a workspace document. The workspace viewer 128 maps attributes for each document referenced by the workspace document into the outline of a screen object that is associated with that document.

For example, in an implementation of workspace viewer 128, the position of a document on the screen is affected by changing the intrinsic attributes corresponding to the x position, y position, and z position of the document in the context of the current arrangement of the workspace document. Similarly, a direct manipulation by the user 120 of the screen position of a document changes the intrinsic attributes of that document.

The inside of the screen object for each document is rendered by a document renderer 136. The workspace viewer 128 maintains the locations of the screen objects within the workspace, draws the outline of the screen objects, and then negotiates with the document renderer 136 to fill in each document. The document renderer 136 draws appropriate data inside the documents based on attributes of the documents. Each document may indicate its own document renderer 136, based on the value of a document renderer attribute within the document. Both the workspace viewer 128 and the document renderer 136 interpret user-manipulation messages that are directed at screen objects in the current arrangement of the workspace document being displayed.

The script engine 146 executes script written in a system compatible scripting language. Script is executed in the context of the workspace in which it was initiated, and is able to read, write, and search all attributes of documents in the workspace as well as add and delete document references from the workspace, and perform repository specific actions.

A further example of the operation of the example system in FIG. 10 is now described. The user 120 initiates a user action 122, which is detected by the message handler 124. The message handler 124 then executes script using the script engine 146, and dispatches a message 126 to the workspace viewer 128, thus translating the original user action 122 into a command, or instruction for the workspace viewer 128.

The workspace viewer 128 receives the message 126 from the message handler 124, and reads those intrinsic attributes 130 effected by the user action 122, from the workspace cache 132, and recalculates those attributes in the context of the three dimensional workspace. The workspace viewer 128 then writes the recalculated intrinsic attributes 130 to the workspace cache 132.

The document renderer 136 is signaled to update the screen display for each document by either a periodic watchdog process 138, or by a signal from the workspace cache 132 indicating that attributes within the workspace cache 132 have been modified.

Figure 11:
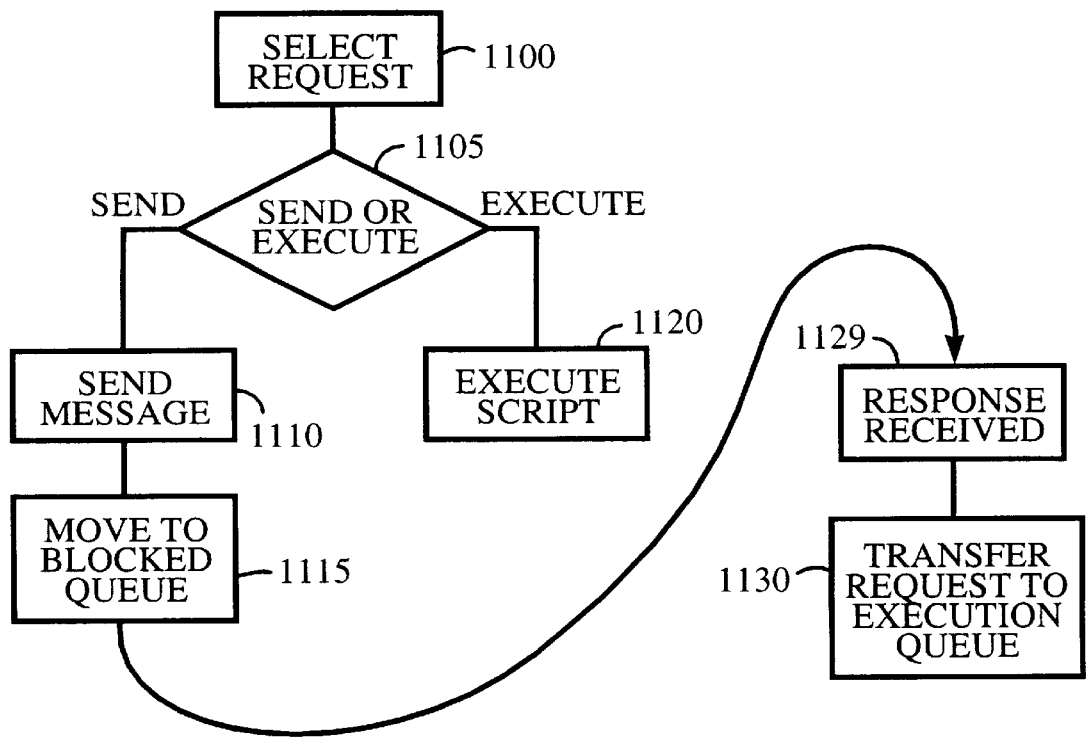
FIG. 11 is a flow chart showing the steps of a method for scheduling using a blocked queue and an execution queue.

FIG. 11 is a flow diagram of steps performed by the message handler 124 to handle events requiring script execution. In step 1100, the message handler receives a request indicating an event has occurred requiring script execution. Next, step 1105, the message handler 124 determines whether the script to be executed requires data from a repository. If the script does require data from a repository, the message handler 124 sends a message in step 1110 to the repository requesting the data, and puts the script to be executed onto a blocked queue in step 1115. If the script to be executed can be executed without data being retrieved from a repository, the message handler 124 causes the script to be placed into an execution queue in step 1120, to be interpreted by the script interpreter and executed. When a response is received in step 1125 from the repository having data needed to execute script placed on the blocked queue in step 1115, the next step is step 1130. In step 1130, the script previously moved to the blocked queue in step 1115 is moved to the execution queue.

The Attribute Format

Figure 12A:
FIGS. 12a and 12b are diagrams showing two embodiments of the attribute format.
Figure 12B:
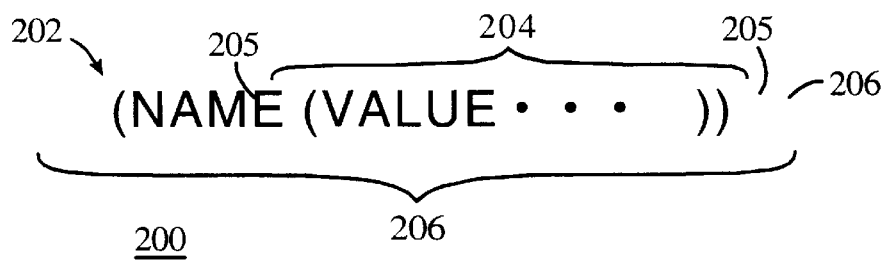

FIG. 12 is a diagram of an embodiment of the format of an attribute. In FIG. 12a, a first embodiment of an attribute 207 is shown having a name 202, a delimiter 203, and a value 204. In FIG. 12b, a second embodiment of an attribute 206 is shown having a name 202, and a value 204 delimited by parenthesis 205. The name 202 and the value 204 are grouped together in a list, delimited by outer parenthesis 206. In list processing languages, core operations are available to extract the first element of the list, in this case accessing the name 202 part of the attribute, and also to extract or evaluate the remainder of the list other than the first element, in this case the value 204 of the attribute. The value 204 of the attribute may consist of script language, and when evaluated or referenced may be interpreted by the script engine.

Scheduling Repository Requests

Figure 13:
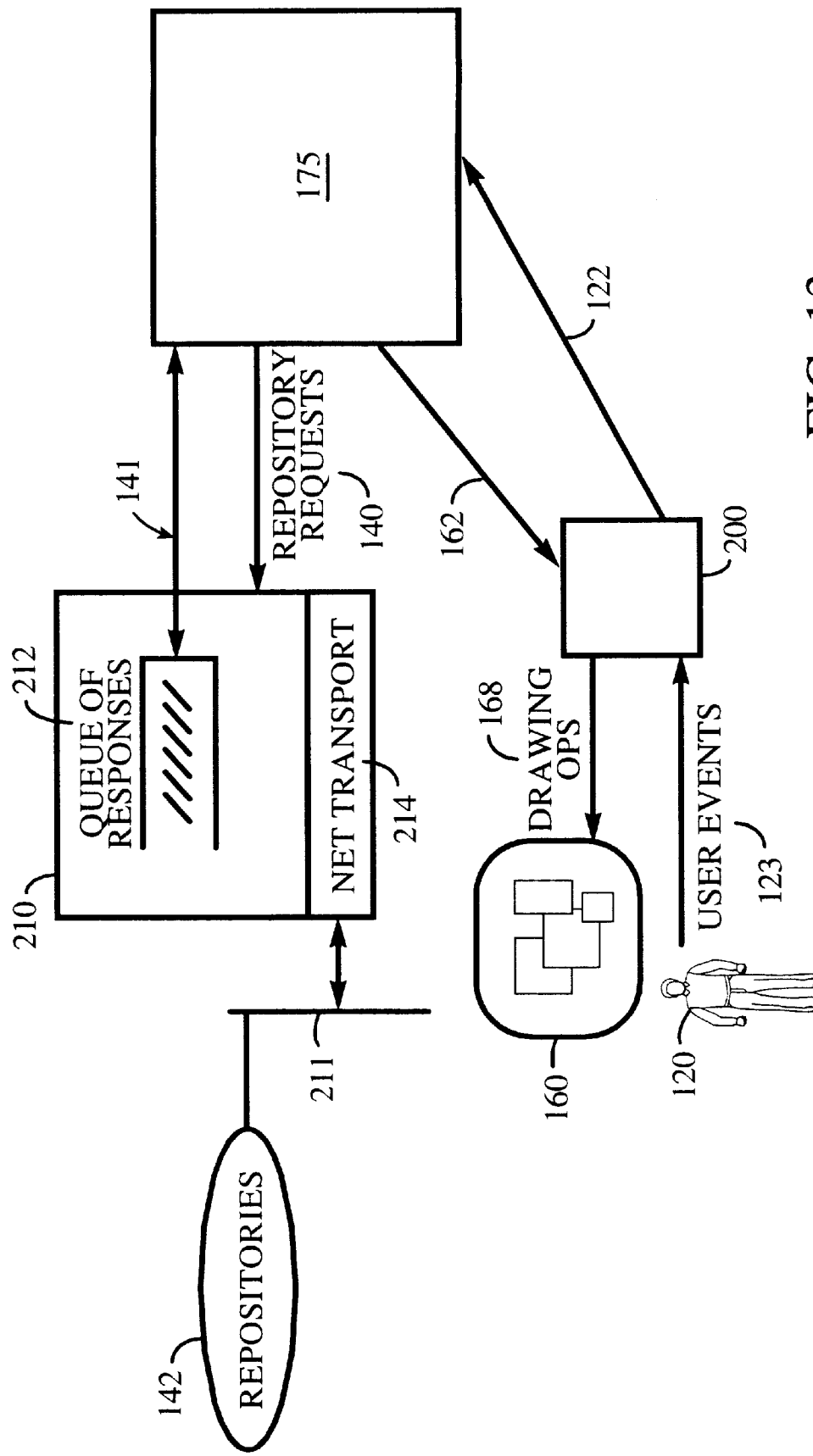
FIG. 13 is a diagram of showing a system having asynchronous remote repository access.

FIG. 13 is a diagram of an embodiment of the system having remote repository access. The core elements 175 of the system (as shown in FIG. 10), are shown coupled to windowing system interface module 200. The interface module 200 is coupled with the display device 160, and also detects user events 123 from a user 120. User events 123 are translated into user actions 122 as understood by the core elements 175. The interface module 200 receives screen update operations 162, and translates the screen update operations into drawing operations 163 specific to the individual windowing system for the implementation. The interface module 200 is responsible for drawing on the display surface of the display device 160 and providing all user interaction events to the core elements 175.

A client module 210 is shown coupled with a LAN 211, the LAN 211 in turn coupled with repositories 142. The client module 210 includes a network transport layer module 214, and a queue of responses 212. The core elements 175 are coupled with the client module 210, receiving repository replies 141, and issuing repository requests 140.

During operation of the elements in FIG. 13, the client module 210 deals with the interactions with the repositories 142. The client module 210 supports making connections and asynchronous requests for data from the repositories 142. Responses are placed in the queue of responses 212. When the core elements 175 issue a repository requests 140, the client module 200 calls the network transport layer module 214 to send a request message over the LAN 211 to the repositories 142. When a response is received from the repositories 142 over the LAN 211 by the network transport layer module 214, the client module 210 puts the response into the queue of responses 212. The core elements 175 eventually dequeue the response from the queue of responses 212. In this way, multiple repository requests 140 may be simultaneously outstanding, responses from the repositories 142 may be received asynchronously, and the responses may be dequeued from the queue of responses 212 as is convenient for scheduling by the core elements 175.

A Method for Retrieving and Displaying Document Information From Repositories

Figure 14:
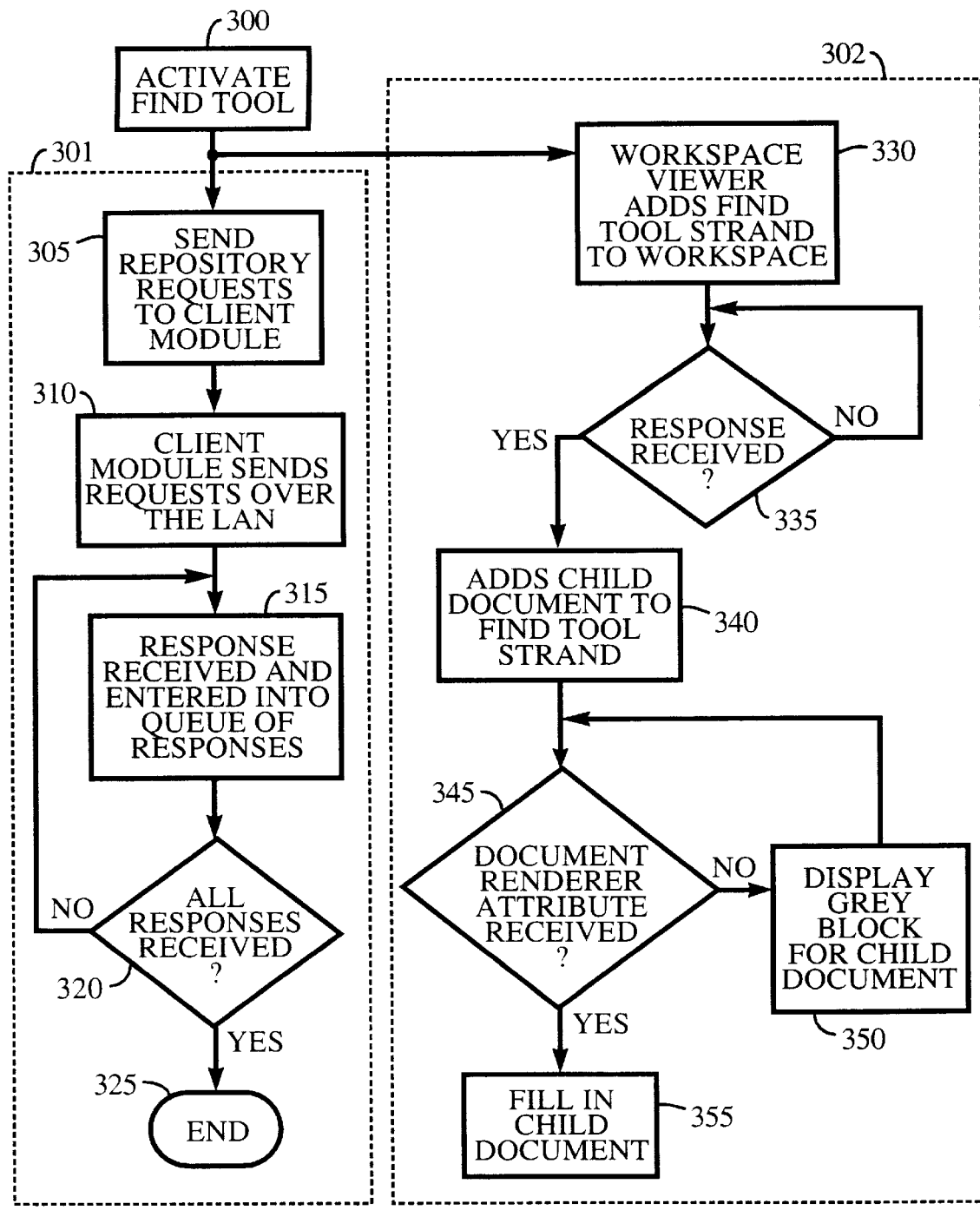
FIG. 14 is a diagram showing the steps of a find tool method for retrieving documents from repositories.

FIG. 14 is a flow chart showing the steps of a method for retrieving attributes from repositories. In step 300 a FIND tool is activated to assemble files matching a given set of parameters into a strand. For example of a given set of parameters, the user could request the FIND tool to retrieve all files with a given extension, or a of a common file type. The find tool starts a first process 301, having steps 305, 310, 315, 320, and 325. In step 305, the find tool sends repository requests to a client module, requesting the client module to obtain files from all repositories matching the given set of parameters. In step 310, the client module sends requests over a LAN to the repositories, for files matching the given set of parameters.

As each repository receives the requests sent by the client module, the repository processes the request and issues a response for any files matching the given set of parameters. In step 315, the client module receives a response from one of the repositories, and enters the response into the queue for responses within the client module. Responses from the repositories may be received in any order.

Decision block 320 determines whether all the needed responses have been received. This may be implemented either through a timer mechanism, or by requiring all repositories to respond whether or not they contain files that match the given set of parameters. When all the responses are received from the repositories, decision block 320 terminates the first process 301 in end state 325.

Second process 302 executes independently from, and in parallel with first process 301. After the FIND tool is activated in step 300, in step 330 the workspace viewer adds the FIND tool strand to the workspace. Until responses are received from the repositories, the FIND tool strand will contain no documents. While the FIND tool itself is the parent document of the strand, and the strand is visually anchored to the FIND tool, the parent document is not on the strand. As the responses are received from the repositories, those documents matching the given set of parameters are added as child documents to the strand.

In step 335, the queue for responses is checked for responses from the repositories. When a response is received indicating a document from one of the repositories that matches the given set of parameters, a child document is added to the FIND tool strand in step 340. In step 345, it is determined whether the document renderer attribute for the child document has been received from the repository. If not, then in step 350 a grey block is displayed on the FIND tool strand for the child document. When it is determined that the document renderer attribute has been received from the repository, the child document is filled in at step 355, by the renderer indicated by the renderer attribute.

Thus, as the FIND tool retrieves documents asynchronously from remote repositories over a LAN, each retrieved document is added to the FIND tool strand in the order the response was received. Until sufficient information is received to fill in the display of the document, the document is displayed as a grey block. Therefore, the requests to the repositories do not lock up the workspace viewer, which may update the workspace independently of the FIND tool operation, or may update the workspace in part as the results of the FIND tool are asynchronously received over the LAN.

Clipping

To clip a document is to restrict the viewable area of the screen object associated with a document in a view. This may be done by dragging any edge of a screen object toward its center. Clipping makes documents look smaller without moving them back in the Z dimension. A clip stop constrains the clipping edge of a document such that it can only be clipped to a specified set of positions.

Documents with clip marks contain hidden information beyond the edge of the document. The hidden information may be revealed by clicking on the clip mark, dragging the clip mark as far down as it will go, and releasing the mouse button. This unclips the hidden information.

Annotating Documents: Information Stickers

Whenever a new document is scanned, faxed or sent through electronic mail, and then subsequently fetched to a workspace, the system will annotate that document to indicate that it has not been read. The system may staple an information sticker to the new document, thereby creating a fixed visual relationship between the information sticker and the new document. After the information sticker is stapled to the document, the information sticker will be displayed in the position at which it was stapled relative to the new document whenever the new document is displayed. The fields of the information sticker and their contents depend on where the document came from. The user can add or delete fields within the information sticker and edit them as needed. The user will typically add information to help find the document later. The user may alternatively fill in the fields by dragging the document over a tool which has been set up to automatically fill in certain fields of the information sticker. Once the desired fields are added and filled in, there is no need to "file" the document in the traditional sense. The user can remove it from the workspace, put it in a pile, or retrieve it later using the values typed in the information sticker fields. As an alternative to stapling information stickers to new documents, the system may use another means of annotation, such as making the new document a specific color, or writing text to an attribute or editable field of the new document.

To add a note to a document, for example when the document is shared by multiple users, a user can also staple a sticker onto a document. The sticker is actually a simple text document that can be edited by the user.

Any page of any document can have a sticker stapled to it. To get a sticker, the user shift-drags a sticker off of a sticker pad. Specifically, the user may move the mouse cursor over a sticker pad screen object, press the mouse button and the shift key simultaneously, and remove a sticker off of the sticker pad. The user then moves the sticker over a document and releases the mouse button and shift key to staple the sticker to the document.

Clip Marks on Stickers

To add more information than there is room to add on the sticker, the user may pull down on the clip mark to make more room in which to type. To make the sticker small again, the user may grab the clip mark and drag it up until the sticker is the desired size.

Removing a Document from the Workspace

Removing a document from the workspace may cause the document, and its permanent attributes to be written back to the repository. When a document is removed from the workspace, the ephemeral attributes for that document within that workspace are lost. To remove a document from the workspace in an example embodiment, the user holds down the Shift key and drags the document out of the workspace window. When the mouse button is released while the document is outside of the window, the document or documents being dragged will be removed from the workspace. The documents are not deleted from their repositories, just from the workspace.

Sharing Documents Among Multiple Users

A first user and a second user sharing a repository can share documents. For example, a first user may show a document to a second user using a SHOW TO tool. The system allows the first user to call the document to the attention of the second user, and add a note to it if needed. The first user first selects the document and locates the SHOW TO tool in the tool rack. The first user then presses the SHOW TO tool's button by clicking the mouse over the button displayed on the SHOW TO tool, and the SHOW TO tool unclips one clip stop. Next, the first user enters the username of the second user, and optionally, a note regarding the selected document. The first user then presses the SHOW TO tool's button a second time, and the SHOW TO tool clips to its original size, and the documents remain where they are in the current workspace.

The person named will find the document in his or her IN BOX pile. An information sticker is added to the top of any document called to someone's attention. The sticker has the first user's name and the date it was called to their attention, along with any notes typed by the first user. If the document already has an information sticker on it, a new one with the new information is placed on top of it.

If the first user enters more than one name into the SHOW TO tool, the document is called to the attention of each of those users.

To create a customized SHOW TO tool to bring documents to the attention of a second user, the first user first selects the SHOW TO tool. The first user then presses the button on the DUPLICATE tool in the tool rack, or drops the SHOW TO tool onto the DUPLICATE tool. A new tool is thus created called "SHOW TO copy". The first user then changes the title of the tool so it contains the second user's name. Every time this tool is used, either by selecting documents and clicking its button, or by dropping documents on it, it marks the documents to the attention of the second user.

As stated above, when the first user calls a document to the second user's attention, the document appears piled under the IN BOX of the second user. When several new documents are called to the second user's attention at once, the first one to arrive is on top of the pile, the next to arrive just behind that, and so on. Documents on the pile that have already been seen but that have been left on the IN BOX pile are piled behind the batch of new documents.

When a document is piled in an IN BOX pile because a first user has marked it for a second user's attention, an information sticker is placed across the top of the document. A document that has not been read has a colored line across the top of the new document's information sticker. Other documents in the IN BOX pile have no colored line on their information sticker.

To read a document from the IN BOX, the user grabs it by the corner and pulls it close to the front of the workspace. Then the information sticker can be moved in order to see all of the first page of the document. The sticker can be moved to some other place on the document or pulled completely off.

The sticker may have a hidden message. To read the hidden message, the sticker must be unclipped. When the sticker is moved or unclipped, its colored line will disappear, signifying that the document is no longer new.

Every time a document is called to a user's attention, it is piled near the IN BOX if that tool is in the user's workspace. The user can set the time when documents are gathered, either to collect them only when requested or constantly.

Using Ephemeral Attributes to Share Documents Among Multiple Users

Figure 15:
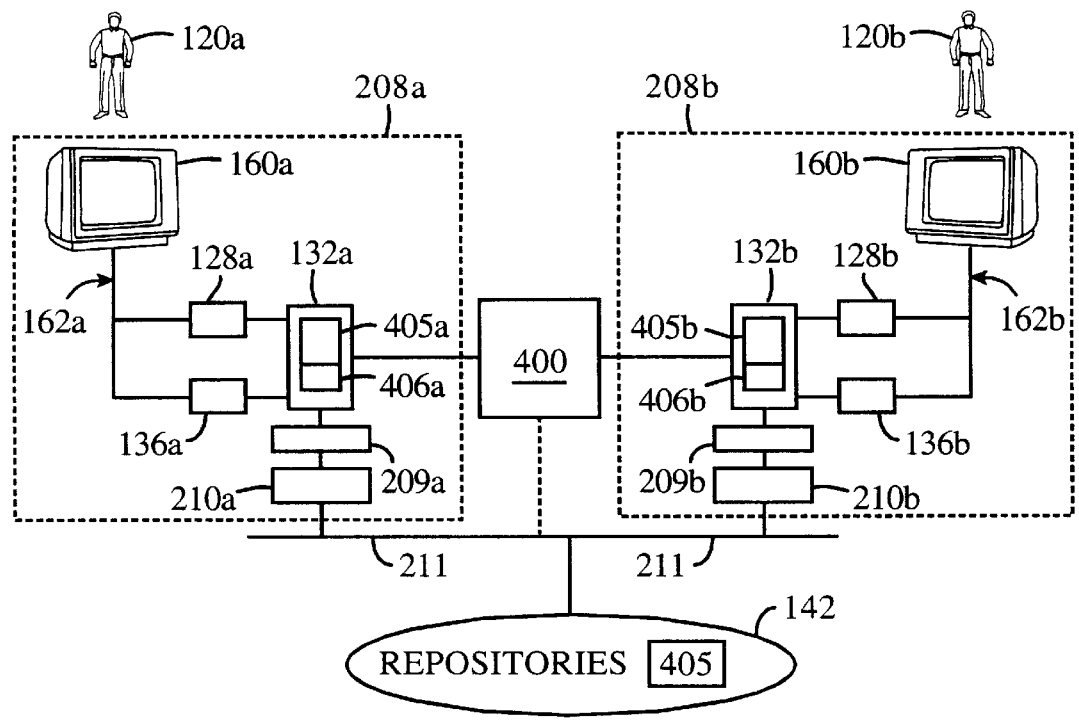
FIG. 15 is a diagram of an apparatus for sharing a document between two users.

FIG. 15 shows an apparatus for sharing the visual display of a document using ephemeral attributes. A first user 120a and a second user 120b are shown sharing a document 405. The first user 120a is shown using display device 160a. The display device 160a is shown coupled with a workspace viewer process 128a and a document renderer process 136a. The workspace viewer process 128a and document renderer process 136a are coupled with workspace cache 132a. The workspace cache 132a contains a first copy 405a of document 405, as well as ephemeral attributes 406a describing the visual display of document 405 on the display device 160a. The workspace cache 132a is coupled with a client module 210a and a network connection 400. The client module 210a is coupled with a LAN 211. The network connection 400 may optionally be coupled with the LAN 211.

A second user 120b is shown using a second display device 160b. The second display device 160b is shown coupled with a second workspace viewer process 128b and a second document renderer process 136b. The second workspace viewer process 128b and second document renderer process 136b are coupled with second workspace cache 132b. The second workspace cache 132b contains a second copy 405b of document 405, as well as ephemeral attributes 406b describing the visual display of document 405 on the second display device 160b. The second workspace cache 132b is coupled with a second client module 210b and the network connection 400. The second client module 210b is coupled with the LAN 211. The network connection 400 may optionally be coupled with the LAN 211.

During operation of the elements in FIG. 15, the first user 120a references document 405, and the client module 210a requests that document 405 be retrieved from the repositories 142 over LAN 211. The client module 210a receives document 405 over LAN 211, and the first copy 405a of document 405 is written into workspace cache 132A. As the first user 120a manipulates the display of document 405 on display device 160a, the values of ephemeral attributes 406a change to reflect the actual display of document 405 on display device 160a.

Further during operation of the elements in FIG. 15, the second user 120b requests the document 405 be retrieved from the repositories 142 over LAN 211. The second client module 210b requests that document 405 be retrieved from repositories 142 over LAN 211. The second client 210b receives document 405 over LAN 211, and the second copy 405b of document 405 is written into the second workspace cache 132b. The ephemeral attributes 406a are then transmitted through the network connection 400, and written into second ephemeral attributes 406b. The second ephemeral attributes 406b are then used by the second workspace viewer 128b, and the second document renderer 136b to display document 405 on second display device 160b, such that second user 120b views document 405 consistent with the display of document 405 on display device 160a, as seen and manipulated by the first user 120a.

As an alternative method for sharing the visual display between the two users, the ephemeral attributes 406a and 406b could be promoted to permanent attributes by each user, and then stored back to the repositories 142. Each client module may then access the repositories 142 to retrieve those permanent attributes, convert the permanent attributes to ephemeral attributes, and update the local display.

Creating a Document via the Merging of Existing Documents

Figure 16:
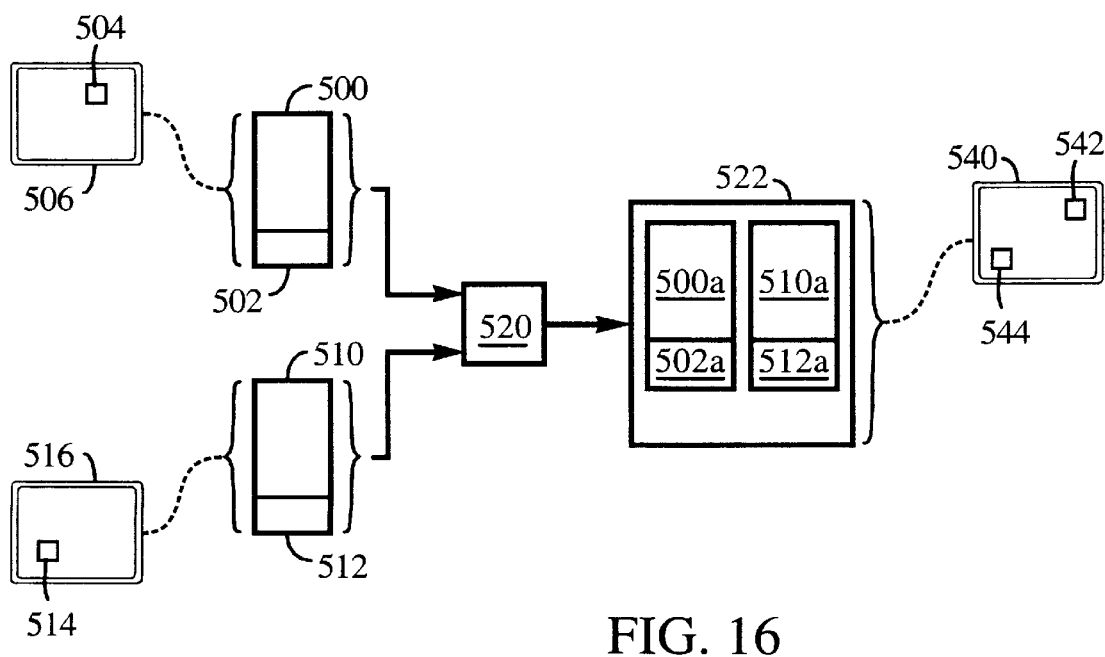
FIG. 16 is a diagram of an apparatus for merging multiple documents based on their visual display attributes.

FIG. 16 is a diagram of a method for merging multiple documents based on their visual display attributes. A first document 500 is shown associated with ephemeral attributes 502 within a first workspace 506. Applying ephemeral attributes 502 to first document 500 result in the first workspace 506 having screen object 504 representing first document 500. Similarly, second ephemeral attributes 512 applied to a second document 510 result in a second workspace 516 having a screen object 514 representing second document 510.

A merging process 520, typically implemented in script language, takes as input first document 500, ephemeral attributes 502, second document 510, and ephemeral attributes 512. The merging process 520 outputs a new workspace document 522, including a copies of the first document 500a, ephemeral attributes 502a, second document 510a and ephemeral attributes 512a. The new workspace document 522 produces a visual display 540 having screen objects 542 (corresponding to screen object 504), and 544 (corresponding to screen object 514).

A Multithreaded System for Retrieving Documents

Figure 17:
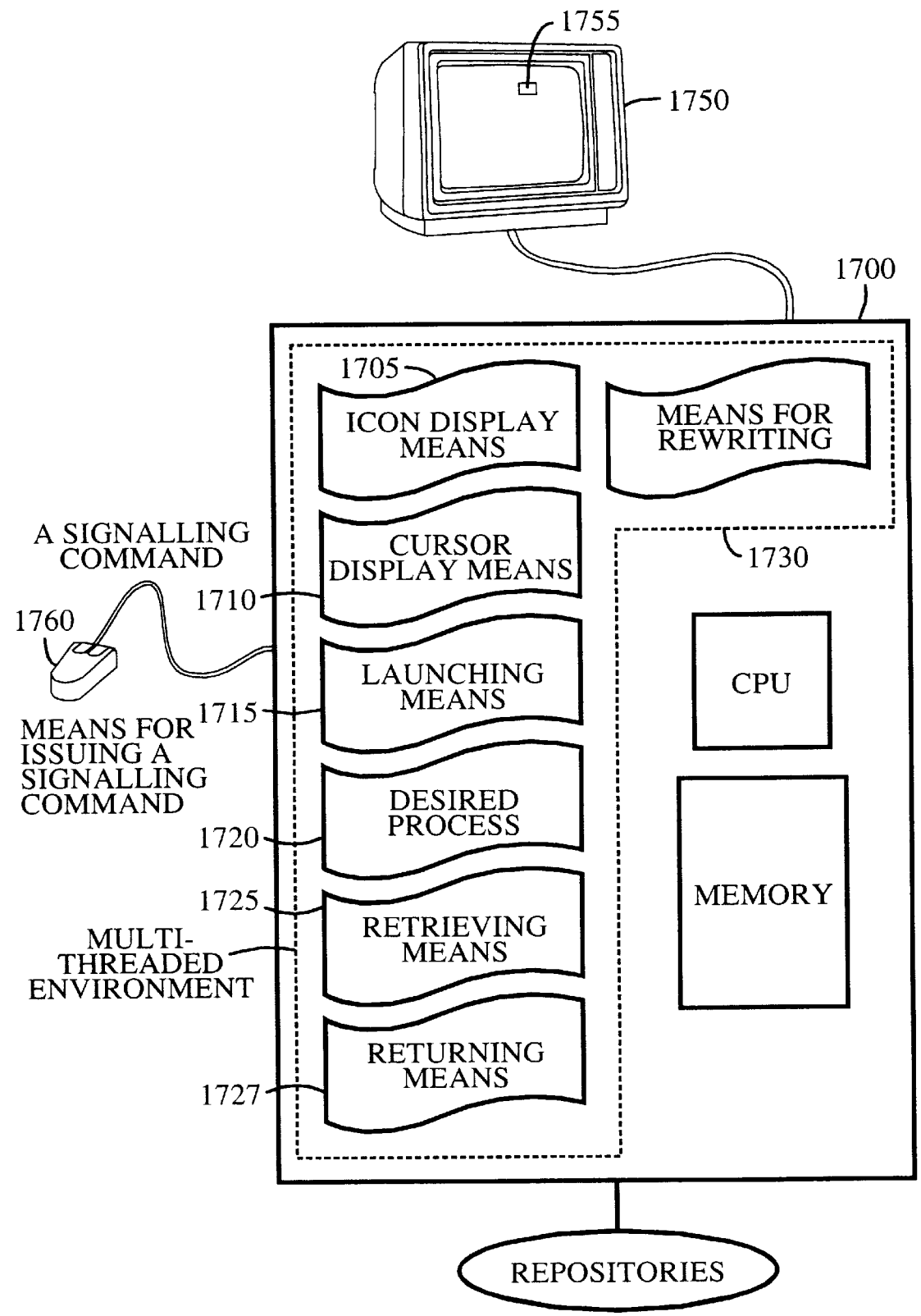
FIG. 17 is a diagram of an apparatus for retrieving documents from repositories and having no busy cursor.

FIG. 17 shows a multithreaded system for retrieving documents, including a display device 1750 coupled to a client device 1700. The client device 1700 includes a multithreading environment 1730, the multithreaded environment having a icon display means 1705, a cursor display means 1710, a launching means 1715, a desired process 1720, a retrieving means 1725, and a means for returning 1727. The client device 1700 is further coupled with a user interface device 1760, and repositories 1765.

During operation of the elements shown in FIG. 17, the client device displays an icon 1755, through the icon display means 1705, and a cursor, through the cursor display means 1710, on the display device 1750. The user manipulates the user interface device 1760 to issue a signalling command to the client device 1700, the signalling command requesting that desired process 1720 be executed. The client device 1700 receives the signalling command, and the launching means 1715 then launches the desired process 1720, such that the desired process 1720 runs within the multithreaded environment 1730. The desired process 1720 then executes on the CPU 1740. Before the desired process 1720 completes execution, the cursor display means 1710 is allowed to execute on the CPU 1740, thereby maintaining an active cursor while the desired process 1720 makes progress in execution.

Chunks

A chunk is a delimited portion of an object such as an attribute or a document. Chunks are used to efficiently manipulate pieces of data rather than perform operations on entire objects. Chunks allow the user to manipulate strings or pieces of attributes intuitively and without special syntax by generating easy-to-understand descriptions of things that otherwise would require writing a parser.

Chunks are specified by user-defined delimiters at runtime. The delimiters may be single characters, such as a space, a comma, a newline, or a slash. The delimiters may also be multiple characters. Multiple character delimiters allow words in a document to be defined as delimiters so that sections of an existing document may be specified as chunks without the need to insert extra characters as delimiters. Chunks for non-textual documents may be specified with special delimiters. Delimiters may be prefix, postfix, outfix (included on both ends of the range), or infix (included somewhere in the middle of the range like the operators for a parser). However, delimiters at outside boundaries are considered to delimit null chunks, that is, the number of chunks in a string is always one more than the number of delimiters.

Figure 18:
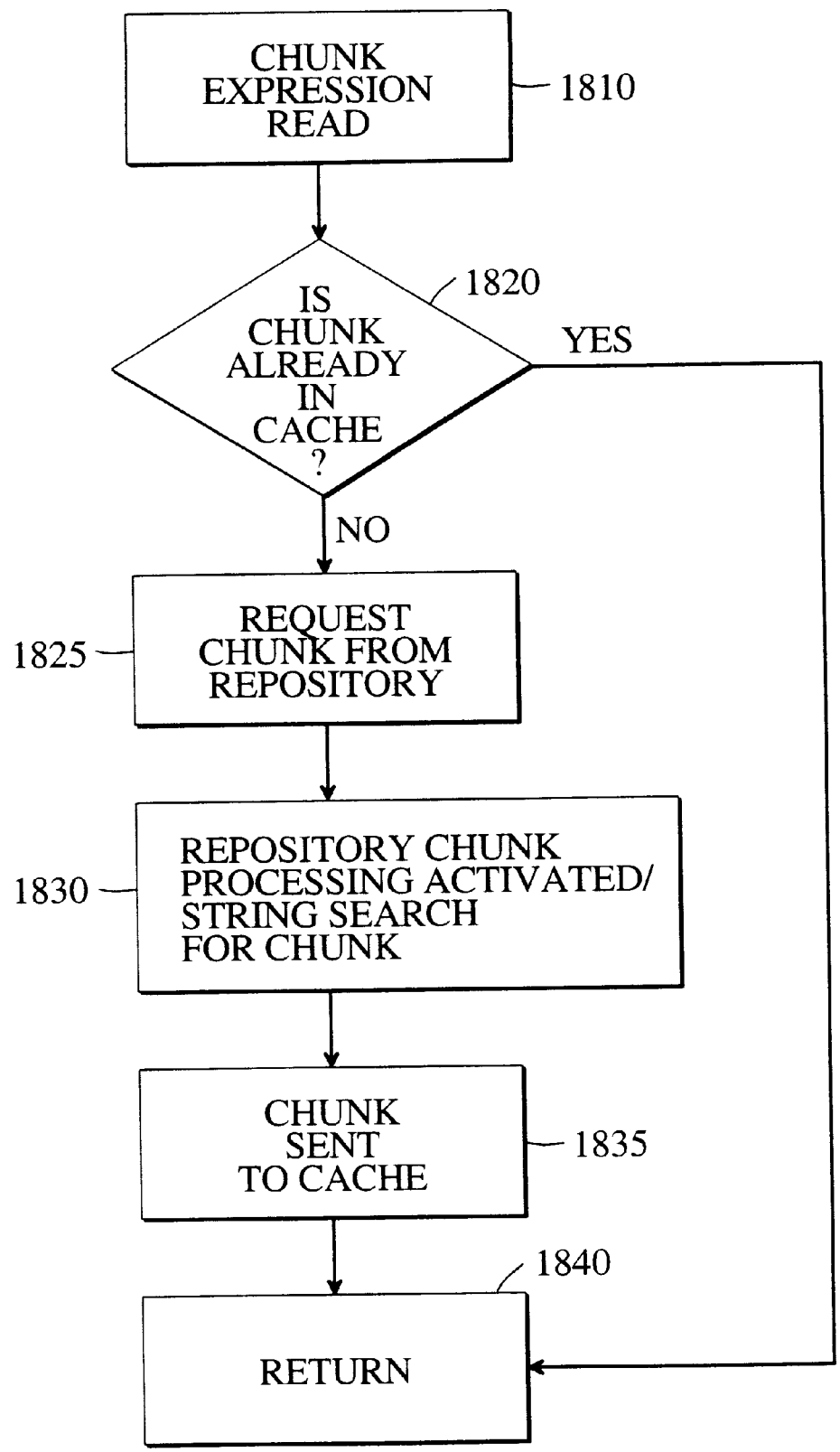
FIG. 18 is a flow chart of retrieving a chunk from the repository.

Chunks are retrieved as shown in FIG. 18. The chunk expression, with user-defined delimiters is read 1810. The cache is checked to find out if the chunk has already been requested 1820. If the chunk is already in the cache, this information is returned to the user 1840. If the chunk is not present in the cache, the chunk definition from the chunk expression is put into a request message sent to the repository 1825. The repository chunk processing is activated and a string search for the chunk is performed 1830. When the requested chunks are found, they are sent to the cache 1835 and the information is returned to the user 1840.

With a chunk expression, string manipulation may be performed without special syntax. For example, given the string "a\b\c\d\e\f", the letter "e" may be extracted by the command, "item 5 by "\" ".

A null delimiter causes chunks to be considered characterwise. A string with a null delimiter is treated as though there were a delimiter between each character. For example, given the string "ABCDEF" and the chunk expression "items 3 to 5 by NULL of "ABCDEF"," the result would be "CDE." Negative numbers in a chunk expression cause the chunks to be listed from front to back. For example, given the chunk expression "item −1 to 1 by "," of "theme, on a, variations"," the result would be "variations, on a, theme."

Chunks may be nested. This may be illustrated using the strings in the following text,

```
(COLOR   (colorn (x, y, z),
         (color1 (100, 0, 100)
         (color2 (85, 40, 60)).
```

In order to change the "0" to "50" to change the color, the "0" may be specified by the following:

```
"item 2 by ", "of item 2 by"("of line 2 of attribute
COLOR".
```

Chunk enclosures are partially ordered in a hierarchy in order to allow checking of syntax with recursion, support nested chunk caches, and support typed chunks with sub-objects. In the present embodiment of the invention, the partial ordering is as follows:

```
document > attribute,
attribute > value,
value > paragraph,
paragraph > line,
paragraph > picture,
paragraph > sound,
line > word,
line > character,
word > character.
```

Specific chunks of a document may also be directly named in order to provide access to a specific portion of the document. Named chunks are anchors to a spot in a document which remains accessible no matter how much the document changes around it.

An application of chunks is the efficient manipulation of data. Moving and storing data in the cache as chunks is much more efficient than moving entire documents or even entire attributes. Chunks are a particular advantage in a client-server environment where a large amount of information travels over the network. If, for example, only a part of an attribute were needed, that part could be specified as a chunk and then only that chunk would be transported over the network to the cache. In this way, chunks greatly reduce network traffic because only the information which is needed is transported over the network.

Figure 19:
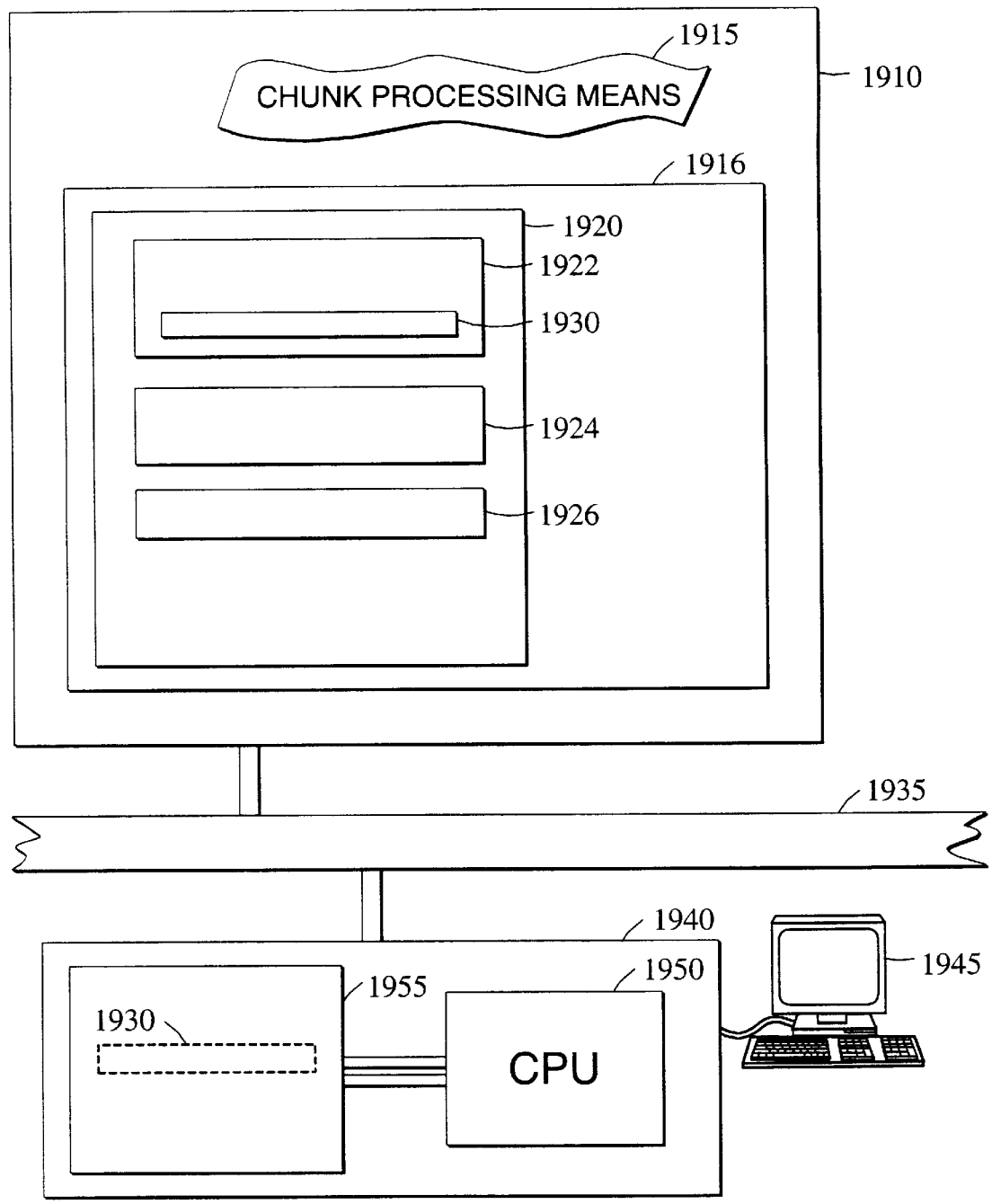
FIG. 19 is a repository with chunk processing means connected to a computer over a network.

With chunks, much less space in the cache is needed to perform tasks. The cache contains only the specified chunks instead of entire attributes and documents. A cache and repository with chunk processing means are illustrated in FIG. 19. A repository 1910 has a chunk processing means 1915 and a memory 1916 containing a document 1920 with attributes 1922, 1924, 1926. The repository could, for example, be a computer with a CPU and a hard drive for storage. A chunk 1930 is defined in one of the attributes 1922. The repository 1910 is connected to a network 1935. A computer 1940 having an input means 1945, such as a terminal and a mouse, and a CPU 1950 and a cache 1955 is also connected to the network 1935. When a piece of an attribute is needed, a request is sent to the repository 1910. The chunk processing means 1915 searches the repository 1910, finds the chunk 1930 which was requested and sends it over the network 1935 to the cache 1955. The cache 1955 stores chunks and also keeps a record of the chunks. That is, the cache maintains a data structure with records of which parts of attributes are stored in it. If, for instance, an entire attribute is later requested, only those parts which were not already in the cache would be requested from the repository.

It is to be understood that the invention is not necessarily limited to the particular embodiment shown herein. The invention may be adapted to a wide variety of information management systems. It is also to be understood that various adaptations and modifications may be made within the spirit and scope of the invention.

What is claimed is:

1. In a computer network formed of a plurality of nodes, a document management apparatus, comprising:

a repository for storing at least one document, the repository being formed of memory of a first node in the network;

means for a user at search run-time to define a delimiter said delimiter indicating a location in said at least one document;

a working memory directly coupled to a processor, the working memory and processor being of a second node in the network;

means for launching a search of said at least one document in said repository for a first occurrence of said delimiter, and for launching a search of said at least one document for a second occurrence of said delimiter;

means responsive to said means for launching a search, for retrieving a chunk of said at least one document from said repository, said chunk of said at least one document from said repository beginning after the first occurrence of said delimiter and ending before the second occurrence of said delimiter; and means for transferring and depositing said chunk of said at least one document in said working memory of the second node such that portions smaller than whole attributes of documents and portions smaller than whole documents are transported across the network thereby reducing network traffic.

2. An apparatus as in claim 1 wherein said delimiter has multiple characters.

3. An apparatus as in claim 1 wherein said repository and said cache are connected over a network.

4. An apparatus as in claim 1 wherein said delimiter is a null delimiter.

5. An apparatus as in claim 1 wherein said means for launching a search further comprises a means for executing a chunk expression, said chunk expression comprising said delimiter.

6. An apparatus as in claim 5 wherein said means for executing a chunk expression further comprises a means for determining if said chunk of said at least one document defined by the first occurrence of the delimiter and the second occurrence of the delimiter requested in the chunk expression is in said working memory directly coupled to the processor of the second network node.

7. An apparatus as in claim 1 wherein said delimiter has one character.

* * * * *